United States Patent
Kim et al.

(10) Patent No.: US 9,983,777 B2
(45) Date of Patent: *May 29, 2018

(54) USER INTERFACE METHOD AND APPARATUS FOR MOBILE TERMINAL HAVING TOUCHSCREEN

(71) Applicant: Samsung Electronics Co., Ltd., Suwon-si, Gyeonggi-do (KR)

(72) Inventors: Soon Hwa Kim, Suwon-si (KR); Jung Yeob Oh, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 345 days.

This patent is subject to a terminal disclaimer.

(21) Appl. No.: 14/744,873

(22) Filed: Jun. 19, 2015

(65) Prior Publication Data

US 2015/0286358 A1    Oct. 8, 2015

Related U.S. Application Data

(63) Continuation of application No. 12/346,156, filed on Dec. 30, 2008, now Pat. No. 9,104,301.

(30) Foreign Application Priority Data

Mar. 7, 2008   (KR) ........................ 10-2008-0021559

(51) Int. Cl.
*G06F 3/048*    (2013.01)
*G06F 3/0486*   (2013.01)
(Continued)

(52) U.S. Cl.
CPC .......... *G06F 3/0486* (2013.01); *G06F 3/0482* (2013.01); *G06F 3/0488* (2013.01);
(Continued)

(58) Field of Classification Search
CPC ......... G06F 3/04892; G06F 2200/1614; G06F 3/0482; G06F 3/04886; G06F 3/04817
See application file for complete search history.

(56) References Cited

U.S. PATENT DOCUMENTS

| | | |
|---|---|---|
| 5,644,737 A | 7/1997 | Tuniman et al. |
| 6,031,530 A | 2/2000 | Trueblood |

(Continued)

FOREIGN PATENT DOCUMENTS

| | | |
|---|---|---|
| CN | 1949905 A | 4/2007 |
| EP | 1469374 A1 | 10/2004 |

(Continued)

OTHER PUBLICATIONS

Win PC~ (Non-patent document), p. 136, Jan. 1, 2007.

(Continued)

*Primary Examiner* — Rashawn N Tillery
(74) *Attorney, Agent, or Firm* — Jefferson IP Law, LLP

(57) ABSTRACT

A user interface method and apparatus for a mobile terminal having a touchscreen are provided. The apparatus and method improve interactivity using a toolbar menu mode screen which allows a user to execute functions and commands with drag and drop behaviors on the touchscreen to graphical objects such as toolbar, icons, and other active objects. An interface apparatus includes a touchscreen unit that displays a screen including a second region for presenting a toolbar having at least one User Interface (UI) element representing a specific function and a first region for activating, when the UI element is dragged from the toolbar and dropped in the first region on the touchscreen, the function represented by the UI element. The interface apparatus also includes a control unit which detects a drag and drop action of the UI element and activates, when the drag and drop action is detected, the function associated with the UI element in the form of an active function object. The (Continued)

interface apparatus of the present invention registers the frequently used functions with the toolbar in the form of icons such that, when an icon is dragged from the toolbar to the main window, the function represented by the icon is activated.

28 Claims, 30 Drawing Sheets

(51) Int. Cl.
  *G06F 3/0481*  (2013.01)
  *G06F 3/0488*  (2013.01)
  *G06F 9/44*  (2018.01)
  *H04M 1/725*  (2006.01)
  *G06F 3/0482*  (2013.01)
  *G06T 3/60*  (2006.01)

(52) U.S. Cl.
  CPC ...... *G06F 3/04817* (2013.01); *G06F 3/04886* (2013.01); *G06F 9/4443* (2013.01); *G06T 3/60* (2013.01); *H04M 1/72583* (2013.01); *G06F 2200/1614* (2013.01)

(56) References Cited

U.S. PATENT DOCUMENTS

| | | | |
|---|---|---|---|
| 7,665,032 | B2 | 2/2010 | Fisher et al. |
| 7,779,363 | B2 | 8/2010 | Keohane et al. |
| 2002/0115476 | A1 | 8/2002 | Padawer et al. |
| 2003/0117427 | A1 | 6/2003 | Haughawout et al. |
| 2004/0012572 | A1 | 1/2004 | Sowden et al. |
| 2004/0049743 | A1 | 3/2004 | Bogward et al. |
| 2004/0223004 | A1 | 11/2004 | Lincke et al. |
| 2004/0257341 | A1 | 12/2004 | Bear et al. |
| 2005/0024341 | A1 | 2/2005 | Gillespie et al. |
| 2005/0267876 | A1 | 12/2005 | Watanabe et al. |
| 2005/0289476 | A1 | 12/2005 | Tokkonen |
| 2006/0010394 | A1 | 1/2006 | Chaudhri et al. |
| 2006/0015818 | A1 | 1/2006 | Chaudhri et al. |
| 2006/0156248 | A1 | 7/2006 | Chaudhri et al. |
| 2007/0036346 | A1 | 2/2007 | Kwon |
| 2007/0085759 | A1 | 4/2007 | Lee et al. |
| 2007/0118813 | A1 | 5/2007 | Forstall et al. |
| 2007/0121614 | A1 | 5/2007 | Sandell et al. |
| 2007/0192725 | A1 | 8/2007 | Chen et al. |
| 2007/0266319 | A1 | 11/2007 | Matsuo |
| 2007/0277125 | A1 | 11/2007 | Shin et al. |
| 2008/0052945 | A1 | 3/2008 | Matas et al. |
| 2008/0059888 | A1 | 3/2008 | Dunko |
| 2008/0104537 | A1 | 5/2008 | Scott |
| 2008/0158189 | A1 | 7/2008 | Kim |
| 2008/0195961 | A1 | 8/2008 | Bae et al. |
| 2008/0252611 | A1 | 10/2008 | Min et al. |
| 2009/0049392 | A1 | 2/2009 | Karttunen et al. |

FOREIGN PATENT DOCUMENTS

| | | | |
|---|---|---|---|
| EP | 1637979 | A1 | 3/2006 |
| JP | 9-114633 | A | 5/1997 |
| JP | 11-24881 | A | 1/1999 |
| JP | 11-249782 | A | 9/1999 |
| JP | 2000-135373 | A | 5/2000 |
| JP | 2000-300538 | A | 10/2000 |
| JP | 2000-349888 | A | 12/2000 |
| JP | 2004-134984 | A | 4/2004 |
| JP | 2004-253004 | A | 9/2004 |
| JP | 2005-70898 | A | 3/2005 |
| JP | 2006-13615 | A | 1/2006 |
| JP | 2007-067724 | A | 3/2007 |
| JP | 2007-86633 | A | 4/2007 |
| JP | 2008-33763 | A | 2/2008 |
| JP | 2008-504610 | A | 2/2008 |
| KR | 10-0801089 | B1 | 2/2008 |
| WO | 2007/069835 | A1 | 6/2007 |

OTHER PUBLICATIONS

Ono Hitoshi, Windows Vista Basics Lecture, YOMIURI PC vol. 13 No. 2, Japan, Yomiuri Newspaper Tokyo Headquarter, Feb. 1, 2008, vol. 13.

USER INTERFACE METHOD AND APPARATUS FOR MOBILE TERMINAL HAVING TOUCHSCREEN

CLAIMS OF PRIORITY

This application is a continuation application of a prior application Ser. No. 12/346,156, filed on Dec. 30, 2008, which claimed the benefit under 35 U.S.C. § 119(a) of a Korean patent application filed in the Korean Intellectual Property Office on Mar. 7, 2008 and assigned Serial No. 10-2008-0021559, the entire disclosure of each of which is hereby incorporated by reference.

BACKGROUND OF THE INVENTION

1. Field of the Invention:

The present invention relates to the control of a mobile terminal More particularly, the present invention relates to a user interface method and apparatus for a mobile terminal having a touchscreen.

2. Description of the Related Art:

With the recent tendency toward functional convergence, mobile terminals are becoming versatile multimedia devices including various integrated supplementary functions such as an electronic dictionary, games, scheduler functions and the like. As the capability and functions of the mobile terminal is diversified, a convenient user interface is becoming an influential factor for improving the utilization of the mobile terminal. For this reason, various user interface mechanisms have been developed and proposed for facilitating manipulation of the mobile terminal. One promising user interface mechanism is a touchscreen.

A touchscreen is a display device that can detect the presence and location of a touch within the display area, whereby a user can execute a command or place a cursor by contacting a specific position on the display area with a finger or a device such as a stylus. There are three types of touchscreen mechanisms that are distinguished by the manner in which they recognize a touch: Resistive, Capacitive, and Surface Acoustic Wave (SAW). A resistive touchscreen mechanism senses a touch on the screen by detecting a change in resistance at a position between two spaced layers of the touchscreen panel, caused by a touch event. A capacitive touchscreen mechanism senses a touch on the screen by detecting a position at which the electric charge on a capacitive layer decreases. Finally, the SAW touchscreen mechanism senses a touch on the screen by detecting a position at which ultrasonic waves, such as infrared waves, passing over the panel are absorbed.

However, most of the conventional touchscreen-based user interface technologies have been developed for use with relatively large interactive display panels and it is difficult to adopt the conventional touchscreen user interfaces to a mobile terminal because of its limited display size. Accordingly, there is a need to develop a touchscreen-based user interface method and apparatus that is capable of facilitating interaction with a mobile terminal having a smaller display size.

SUMMARY OF THE INVENTION

An aspect of the present invention is to address at least the above-mentioned problems and/or disadvantages and to provide at least the advantages described below. Accordingly, an aspect of the present invention is to provide a user interface method and apparatus for a mobile terminal having a touchscreen that is capable of improving interactivity with the mobile terminal using a toolbar menu mode screen which allows a user to execute functions and commands with drag and drop behaviors on the touchscreen to graphical objects such as toolbar, icons, and other active objects.

In accordance with an aspect of the present invention, an interface apparatus for a mobile terminal is provided. The apparatus includes a touchscreen unit for displaying a screen including a second region for presenting a toolbar having at least one User Interface (UI) element representing a specific function and a first region for activating, when the UI element is dragged from the toolbar and dropped in the first region on the touchscreen, the function represented by the UI element, and a control unit for detecting a drag and drop action of the UI element and for activating, when the drag and drop action is detected, the function associated with the UI element in the form of an active function object.

In accordance with another aspect of the present invention, an interface method for a mobile terminal having a touchscreen is provided. The method includes displaying a screen including a second region for presenting a toolbar having at least one User Interface (UI) element representing a function and a first region and activating, when the UI element is dragged from the toolbar and dropped in the first region on the touchscreen, the function represented by the UI element in the form of an active function object within the first region.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 1b is a screenshot illustrating a toolbar menu mode screen of FIG. 1a;

FIG. 2b is a screenshot illustrating a normal menu mode screen of FIG. 2a;

Throughout the drawings, it should be noted that like reference numbers are used to depict the same or similar elements, features and structures.

DETAILED DESCRIPTION OF EXEMPLARY EMBODIMENTS

Figure 1A:
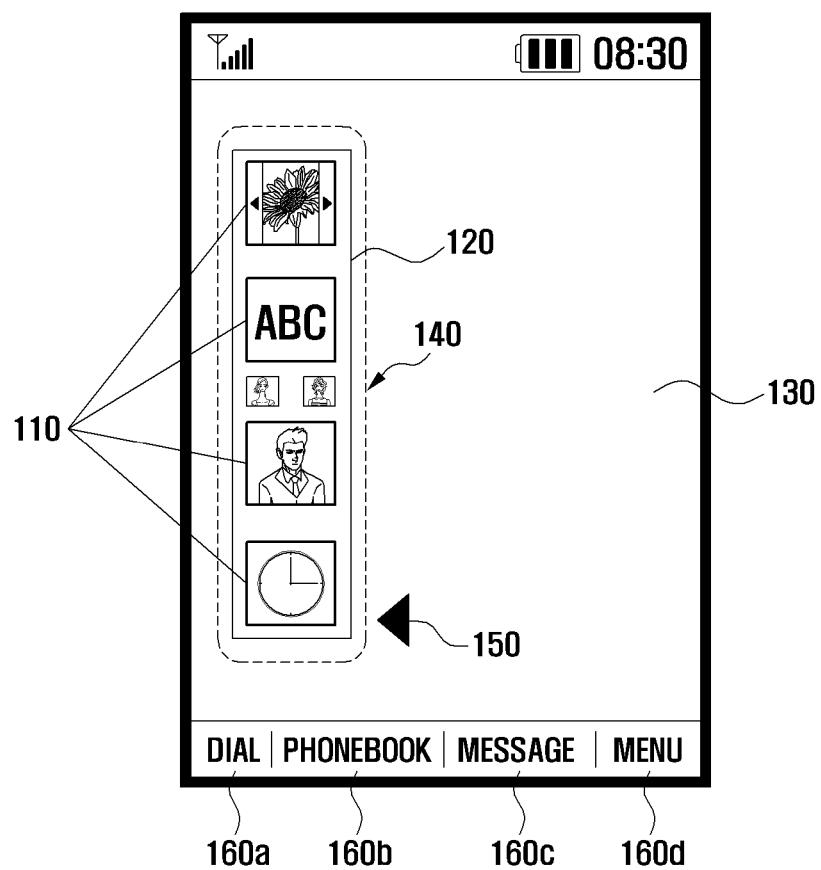
FIG. 1a is a diagram illustrating a toolbar menu mode screen of a mobile terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In the following description, the mobile terminal can be any of a Personal Digital Assistant (PDA), a Smartphone and a cellular network terminal including a Code Division Multiple Access (CDMA) terminal, a Wideband CDMA (WCDMA) terminal, a General System for Mobile communications (GSM) terminal, a General Packet Radio System (GPRS) terminal and their equivalent devices. Furthermore, the mobile terminal is provided with a partial touchscreen or a full touchscreen.

In the following description, the term "touch" denotes a contact event on the touchscreen using a finger or an object such as stylus. The term "drag" denotes a behavior of sliding the finger or object on the touchscreen in a direction.

The term "toolbar menu mode" denotes an operation mode in which a toolbar having a plurality of icons is activated on the touchscreen such that, when one of the icons are dragged from the toolbar and dropped in a main display window, an application represented by the icon is activated. As will be explained below, the toolbar may be located on a side of the touchscreen.

The term "Top-3 icon" denotes a shortcut icon presented with information about a number of counterparty persons selected from a phonebook so as to make a voice call, a message call, or video call, immediately. Although the number "3" is used in the term, it should not be considered a limitation on the number of counterparty persons included as there may any number including three.

The toolbar may include at least one User Interface (UI) element associated with a specific function. The UI element may be presented in the form of an icon.

In the following description, the term "active icon" denotes an icon indicating an active state of an application which is activated by dragging a corresponding UI element (e.g. icon) from the toolbar and dropping the UI element in the main display window.

In the following description, it is to be understood that the singular forms "a," "an," and "the" include plural referents unless the context clearly dictates otherwise. Thus, for example, reference to "a component surface" includes reference to one or more of such surfaces.

FIG. 1a is a diagram illustrating a toolbar menu mode screen of a mobile terminal according to an exemplary embodiment of the present invention. The toolbar menu screen is provided with a toolbar 120, a plurality of icons 110 arranged on the toolbar, the icons representing corresponding applications, a first region 130 as a main display area of the mobile terminal, a second region 140 for placing the toolbar 120, a marker 150 for hiding and showing the toolbar 120, and a plurality menu buttons 160a, 160b, 160c, and 160d for executing corresponding functions of the mobile terminal. In the example of FIG. 1a, the toolbar 120 is positioned on a left side of a display area. However, this location is merely for example and it is understood that the toolbar 120 may be located elsewhere.

The icons 110 are designed with pictures or symbols symbolizing functions of the corresponding applications in order for a user to recognize the applications intuitively.

The toolbar 120 provides the user with an application activation interface such that the user may perceive and activate the applications as desired. The icons 110 can be arranged in a horizontal or vertical direction. In FIG. 1a, the icons 110 are arranged on the toolbar 120 in the vertical direction.

The first region 130 is a main display window on which the applications are executed and execution results are displayed in a visual information form. The first region 130 may be configured to display a specific image with a specific color theme. In this example, if any of the icons 110 arranged on the toolbar 120 is moved to the first region 130, then the application represented by the icon is activated.

The second region 140 may be defined on a side of the touchscreen for placing the toolbar 120 and resized in a direction according to whether the toolbar 120 is hidden or shown. The behavior of the second region 140 is described in more detail with reference to FIGS. 6a to 6h later.

The menu buttons 160a to 160d may be provided on a menu bar of the touchscreen for quick execution of desired menus or applications. In the illustrated example, the menu buttons 160a to 160d are positioned at the bottom of the touchscreen. However, the menu buttons may be positioned elsewhere as desired by the user or as required by the execution of other display operations. Also, although the menu bar is depicted with a dial button 160a for making a call, a phonebook button 160b for loading a phonebook, a message button 160c for checking incoming and outgoing message boxes, and a main menu button 160d for loading the main menu of the mobile terminal in this example, the menu buttons can be replaced by other menu buttons or removed from the menu bar.

Figure 1B:
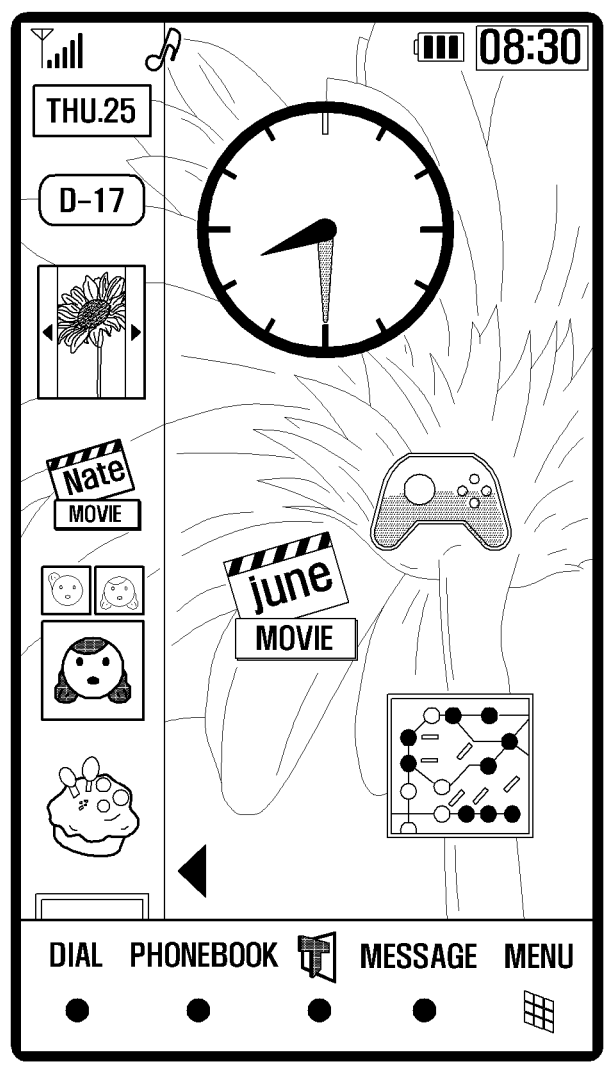

FIG. 1b is a screenshot illustrating a toolbar menu mode screen of FIG. 1a. Although not individually labeled, the illustrated toolbar menu mode screen shows icons 110, toolbar 120, marker 150, and menu buttons 160a to 160d that may be displayed on the touchscreen.

As illustrated in FIG. 1b, the toolbar 120, on which the icons 110 are arranged in vertical direction, is placed on the second region 140. The icons 110 include a date and day icon, a D-day icon, an album icon, a wireless Internet access icon, a Top-3 function icon and others. In the first region 130, a clock and a subway map are activated.

When an icon is dragged from the toolbar 120 and dropped in the first region 130, an application represented by the icon is activated in the first region 130, whereby the user can execute the applications intuitively.

Figure 2A:
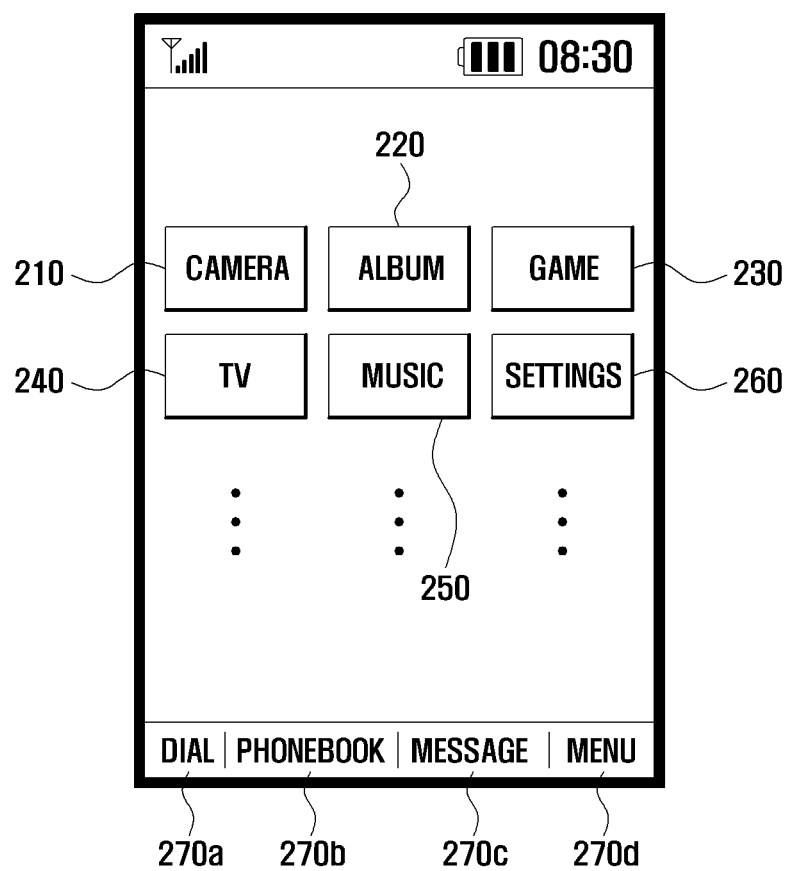
FIG. 2a is a diagram illustrating a normal menu mode screen of a mobile terminal according to an exemplary embodiment of the present invention.

FIG. 2a is a diagram illustrating a normal menu mode screen of a mobile terminal according to an exemplary embodiment of the present invention. In the normal menu mode, the mobile terminal displays a normal menu mode screen having a plurality of menu icons 210, 220, 230, 240, 250, and 260, and a menu bar with a plurality of menu buttons 270a, 270b, 270c, and 270d.

The menu icons 210 to 260 are icons representing applications or functions that are most frequently used by the user. The menu icons may be replaced with other icons, additional icons may be included, or some of the menu icons may be removed from the normal menu mode screen. In this exemplary embodiment, the normal menu mode screen shows a camera icon 210, an album icon 220, a game icon 230, a TV icon 240, a music icon 250, and a setting icon 260. Of course, the functions represented by these icons are merely for example.

The menu buttons 270a to 270d are provided on the menu bar of the normal menu mode screen for quick execution of frequently used menus. In the illustrated example, the menu bar is positioned at the bottom of the normal menu mode screen. However, the menu bar may be positioned elsewhere on the normal menu mode screen. Although the menu bar is depicted with a dial button 270a for making a call, a phonebook button 270b for loading the phonebook, a message button 270c for checking incoming and outgoing message boxes, and a mode switching button 270d for switching to the toolbar menu mode, the menu buttons can be replaced by other menu buttons or removed from the menu bar.

When the mode switching button 270d is selected, the menu mode screen is switched from the normal menu mode screen to the toolbar menu mode screen, an example of which was illustrated in FIG. 1a. In a case that the toolbar menu mode screen is selected, the display is switched to the toolbar menu mode screen which is presented with the settings of the previous toolbar menu mode session.

Figure 2B:
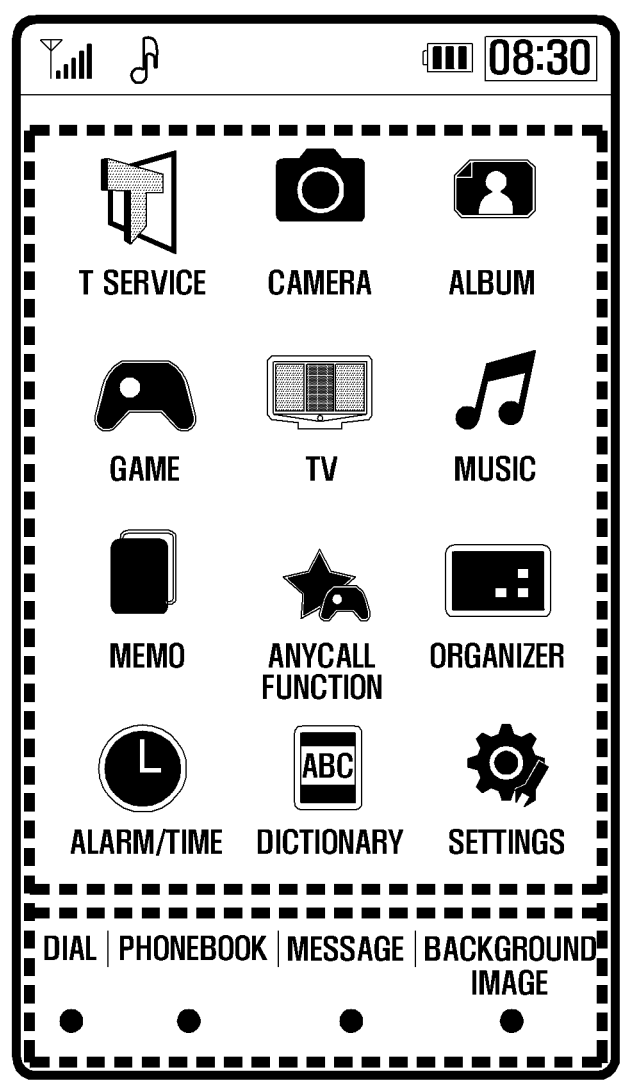

FIG. 2b is a screenshot illustrating a normal menu mode screen of FIG. 2a. The illustrated normal menu mode screen shows the icons and menu bar that may be presented on the touchscreen of the mobile terminal.

As illustrated in FIG. 2b, a main window of the touchscreen presents a wireless Internet access icon, a camera icon, an album icon, a game icon, a TV icon, a music icon, a memo icon, a function icon, a scheduler icon, an alarm and time icon, a dictionary icon, and a settings icon arranged in 3 by 4 alignment. However, the number, kinds and alignment of the icons can be changed by the user.

Figure 3:
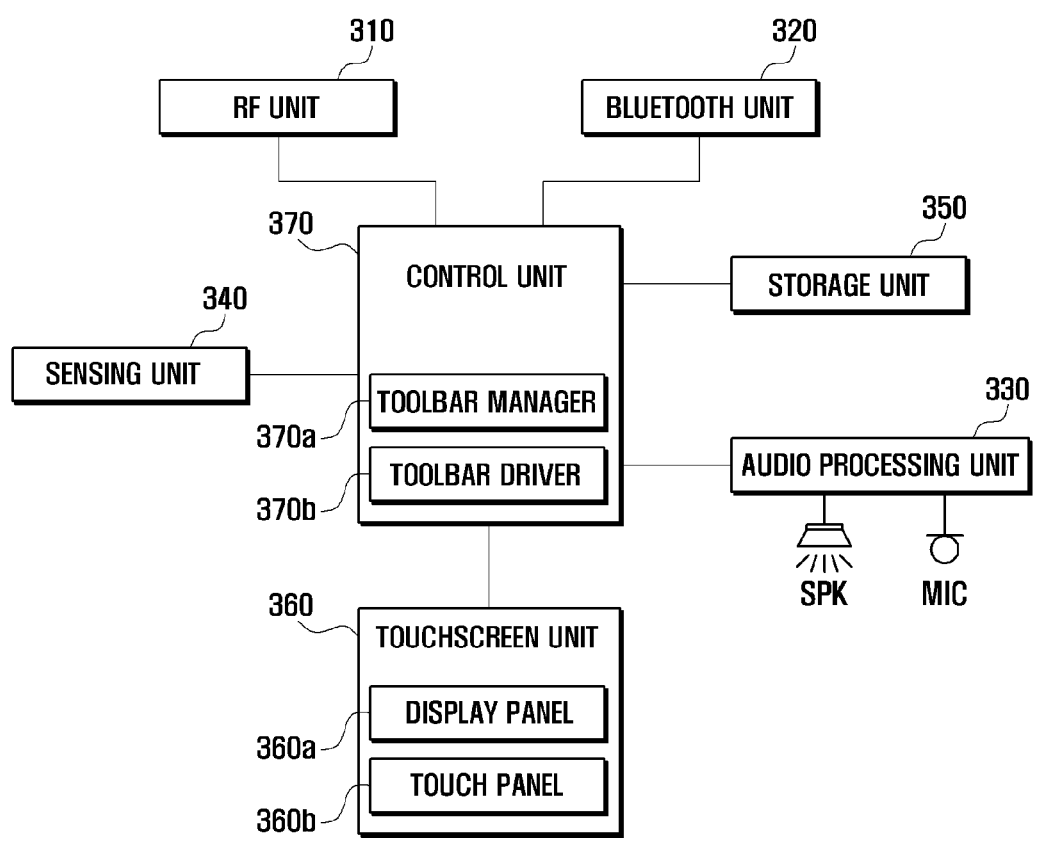
FIG. 3 is a diagram illustrating a configuration of a mobile terminal having a touchscreen according to an exemplary embodiment of the present invention.

FIG. 3 is a diagram illustrating a configuration of a mobile terminal having a touchscreen according to an exemplary embodiment of the present invention. As illustrated FIG. 3, the mobile terminal includes a Radio Frequency (RF) unit 310, a Bluetooth unit 320, an audio processing unit 330, a sensing unit 340, a storage unit 350, a touchscreen unit 360, and a control unit 370. The control unit 370 includes a toolbar manager 370a and a toolbar driver 370b.

The RF unit 310 includes an RF transceiver and a duplexer for processing an RF signal transmission and reception of the mobile terminal.

The Bluetooth unit 320 includes a Bluetooth transmitter and a Bluetooth receiver for communication with a Bluetooth link of a Bluetooth-enabled device.

The audio processing unit 330 is provided with a microphone (MIC) for converting sound into an audio signal and a speaker (SPK) for converting an audio signal into an audible sound.

The sensing unit 340 senses a rotation of the mobile terminal. In an exemplary implementation, the sensing unit 340 may be implemented with a terrestrial magnetic sensor. The terrestrial magnetic sensor measures the strength and direction of the terrestrial magnetism and outputs a measurement value. In an exemplary embodiment, the sensing unit 340 senses the rotation of the mobile terminal and outputs the measurement to the control unit 370 such that the control unit 370 controls an icon placed on the toolbar to rotate in accordance with the rotation of the mobile terminal. That is, the icon is controlled to rotate so as to be easily viewable by the user.

The storage unit 350 may include a long term memory, such as a Read Only Memory (ROM) or a flash memory, and a short term memory such as a Random Access Memory (RAM). The long term memory stores application programs required for the operations of the mobile terminal as well as data entered by a user, such as a phone number. The short term memory stores temporary data that is generated during operation of the mobile terminal.

The touchscreen unit 360 includes a display panel 360a and a touch panel or a touch film 360b. The touchscreen unit 360 may display various visual data produced in the mobile terminal, operation status of the mobile terminal data input by the user and the like. The touchscreen unit 360 also senses a touch on the touch film 360b and outputs a coordinate of the point of contact to the control unit 370. The touchscreen unit 360 may be implemented with any of the resistive, capacitive, and Surface Acoustic Wave (SAW) type mechanisms.

In an exemplary embodiment, the display panel 360a of the touchscreen unit 360 is implemented to display the toolbar menu mode screen and the normal menu mode screen as switchable user interfaces for executing functions of the mobile terminal thereon.

The control unit 370 controls general operations of the mobile terminal. For example, the control unit 370 controls the Bluetooth unit 320 to establish a Bluetooth link with a Bluetooth device located in its Bluetooth radio range. Also, the control unit 370 analyzes a measurement signal sent by the sensing unit 340 (i.e. the terrestrial magnetic sensor) and controls such that an icon placed on the toolbar rotates in accordance with the rotation of the mobile phone.

In an exemplary embodiment, the control unit 370 includes a toolbar manager 370a and a toolbar driver 370b.

When the mobile terminal enters a toolbar menu registration setting mode, the toolbar manager 370a generates a function list listing functions that can be registered to the toolbar 120 and displays the function list on the display panel 360a of the touchscreen unit 360. If a function is selected from the function list, then the toolbar manager 370a updates a setting information file by matching the function with a corresponding icon 110. Table 1 shows an exemplary setting information file.

TABLE 1

| Icon | Function |
| --- | --- |
| Photo album icon | Load Image viewer |
| ABC character icon | Open dictionary |
| Top-3 icon | Make voice, message, and video call, and the like |
| Clock icon | Display Present time |
| — | — |
| — | — |
| — | — |

An icon 110 is designed with a picture, a symbol, or a character associated with the function represented by the icon such that the user recognizes the function intuitively. For example, the camera function is matched to an icon designed having a camera picture.

When the mobile terminal enters the toolbar menu mode, the toolbar driver 370b retrieves the functions registered for the toolbar and displays the toolbar including the icons matched with their registered functions. The toolbar driver 370b also receives the setting information file (e.g. table 1) from the toolbar manager 370a and stores the received setting information file. If it is detected that a specific icon 110 is moved from the toolbar 120 to the first region 130, then the toolbar driver 370b looks up the setting information file and activates the function matched with the icon moved to the first region 130.

Figure 4:
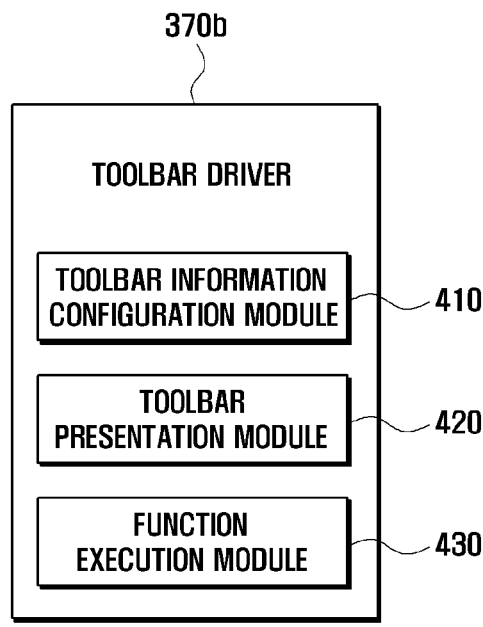
FIG. 4 is a diagram illustrating a configuration of an exemplary toolbar driver of FIG. 3.

FIG. 4 is a diagram illustrating a configuration of an exemplary toolbar driver of FIG. 3. The toolbar driver 370b includes a toolbar information configuration module 410, a toolbar presentation module 420, and a function execution module 430.

Referring to FIG. 4, the toolbar information configuration unit 410 receives and stores the setting information file generated in the form of a table matching the icons 110 with the functions that are supposed to be executed when corresponding icons are moved to the first region 130 of the toolbar menu mode screen. When the mobile phone enters the toolbar menu mode, the toolbar presentation module 420 retrieves the functions registered to the toolbar and presents the toolbar including the icons matched with the registered function on the display panel. When a specific icon is moved from the toolbar 120 to the first region 130, the function execution module 430 looks up the setting information file and executes the function corresponding to the icon moved to the first region 130.

Figure 5:
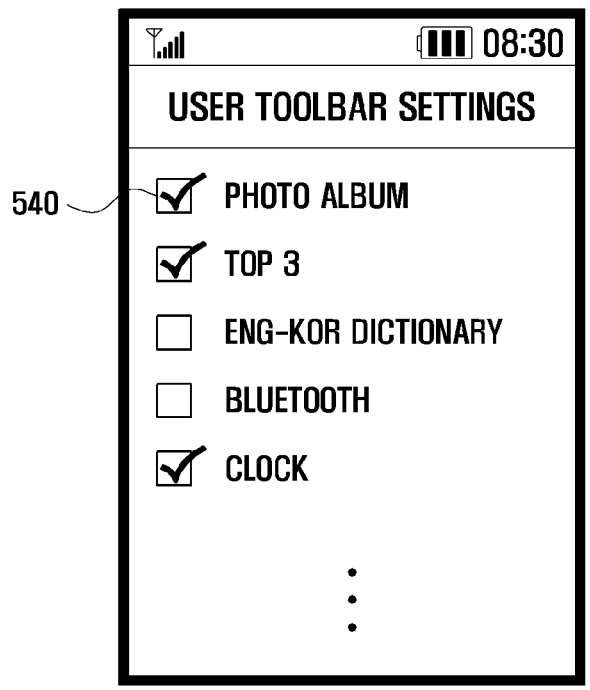
FIG. 5 is a diagram illustrating a toolbar menu registration setting screen displayed on the touchscreen unit of a mobile terminal according to an exemplary embodiment of the present invention.

FIG. 5 is a diagram illustrating a toolbar menu registration setting screen displayed on a touchscreen unit of a mobile terminal according to an exemplary embodiment of the present invention.

When the mobile terminal enters the toolbar menu registration setting mode, the toolbar manager 370a retrieves the function list and presents the function list listing the function items. In an exemplary implementation, check boxes are also presented such that the user can select the functions of which icons are to be presented on the toolbar by selectively marking the checkboxes. Of course, other methods of selecting the desired functions may be implemented, for example highlighting the selected functions.

Exemplary operations of the touchscreen in the toolbar menu mode are described hereinafter with reference to FIGS. 6a to 6h, 7, 8a and 8b, 9, and 10a to 10c.

First Exemplary Embodiment

Figure 6A:
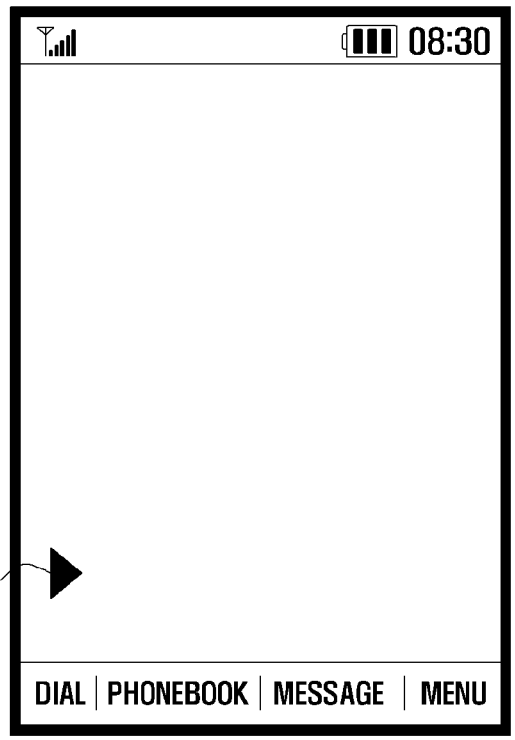
FIGS. 6a and 6b are diagrams illustrating a process of initializing a toolbar menu mode screen and showing a toolbar in a toolbar menu mode screen according to an exemplary embodiment of the present invention.
Figure 6B:
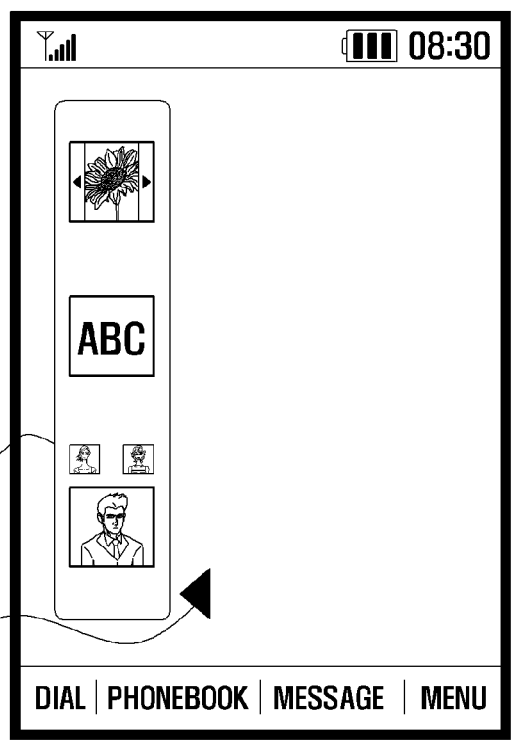

FIGS. 6a and 6b are diagrams illustrating a process of initializing a toolbar menu mode screen and showing a toolbar in a toolbar menu mode screen according to an exemplary embodiment of the present invention.

Referring to FIG. 6a, if the mobile terminal first enters the toolbar menu mode, then the touchscreen unit 360 displays a toolbar menu mode screen substantially empty except for a marker 610 as shown in FIG. 6a. If a touch is detected on the marker 610, the touchscreen unit 360 presents the toolbar 120 in the toolbar menu mode screen as shown in FIG. 6b.

In this manner, the control unit 370 can be configured such that the toolbar menu mode starts with the empty toolbar menu mode screen and the toolbar appears by selecting the marker 610. In an exemplary implementation, the marker 610 can be designed as an iconic object implying a direction. For example, the marker 610 may have the shape of an arrowhead in the form of an equilateral triangle. Prior to display of the toolbar 120, the marker 610 is displayed pointing to the right in the empty toolbar menu mode screen. If the marker 610 is selected and the toolbar 120 appears in the toolbar menu mode screen, the pointing direction of the marker 610 may be changed to the left so as to face the now displayed toolbar 120.

That is, the control unit 370 controls such that, when the toolbar is activated to appear in the toolbar menu mode screen, the marker 610 rotates 180° so as to point to the opposite direction. Also, when a touch on the marker 610 is detected while the toolbar appears, the control unit 370 controls such that the marker 610 is changed to point to the left and controls to cause the disappearance of the toolbar 120.

Figure 6C:
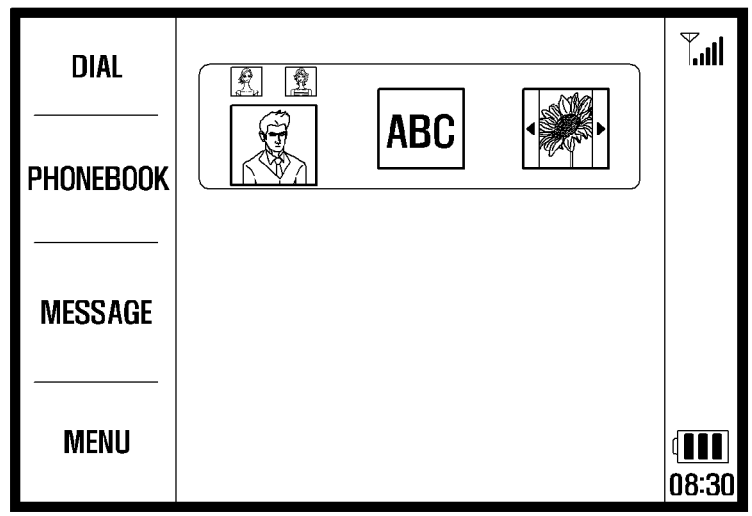
FIGS. 6c and 6d are diagrams illustrating processes of realigning a toolbar menu mode screen according to exemplary embodiments of the present invention.
Figure 6D:
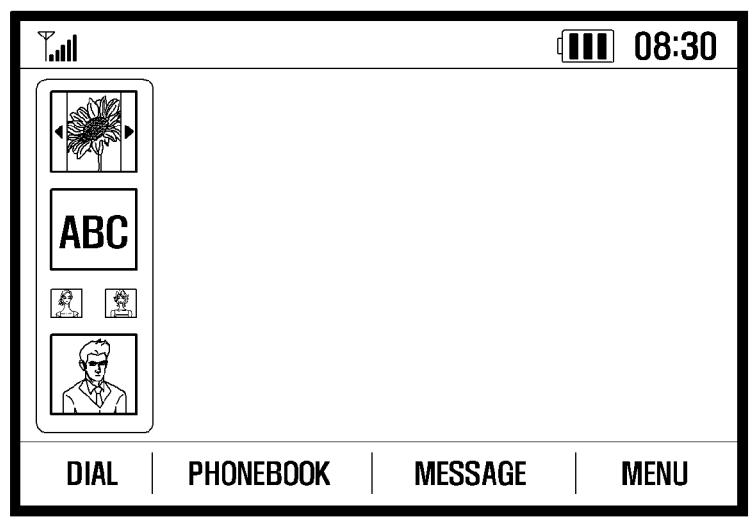

FIGS. 6c and 6d are diagrams illustrating processes of realigning a toolbar menu mode screen according to exemplary embodiments of the present invention.

When the orientation of the mobile terminal is altered, the sensing unit 340 senses the alteration of the mobile terminal and outputs a sensed alteration value to the control unit 370 such that the control unit determines the orientation of the mobile terminal based on the alteration value. The control unit 370 can control such that, when the orientation of the mobile terminal is changed, the orientations of the toolbar and icons placed on the toolbar are changed depending on the direction of the changed orientation of the mobile terminal.

In this exemplary embodiment, when the orientation of the mobile terminal changed from a portrait orientation to a landscape orientation, the orientations of the icons placed on the toolbar and the menu buttons placed on the menu bar are changed without change of the positions and orientations of the toolbar and the menu bar, as shown in FIG. 6c.

For example, when the control unit 370 detects that the orientation of the mobile terminal rotates at 90° in clockwise direction, it controls such that the icons placed on the toolbar rotate at 90° in counterclockwise direction. Also, when the control unit 370 detects that the mobile terminal rotates at 90° in counterclockwise direction, from the portrait orientation to the landscape orientation, it controls such that the icons placed on the toolbar rotate at 90° in clockwise direction.

The control unit 370 also controls the rotation of the menu buttons 160a to 160d placed on the menu bar and indicators (such as a battery indicator, a radio strength indicator, and a present time indicator) placed on a status indication bar within the toolbar menu mode screen in the same manner.

As shown in FIG. 6d, the toolbar menu mode screen may be configured such that, when the orientation of the mobile terminal rotates from the portrait orientation to the landscape orientation in clockwise direction, the toolbar, menu bar, and status indication bar revolve relative to the display panel in opposite direction.

For example, when the control unit 370 detects that the orientation of the mobile terminal rotates 90° in clockwise direction, it controls such that the toolbar, menu bar, and status indication bar revolve relative to the display panel in counterclockwise direction. Also, when the control unit 370 detects that the mobile terminal rotates at 90° in counterclockwise direction, from the portrait orientation to the landscape orientation, it controls such that the toolbar, menu bar, and status indication bar revolve relative to the display panel in clockwise direction.

Figure 6E:
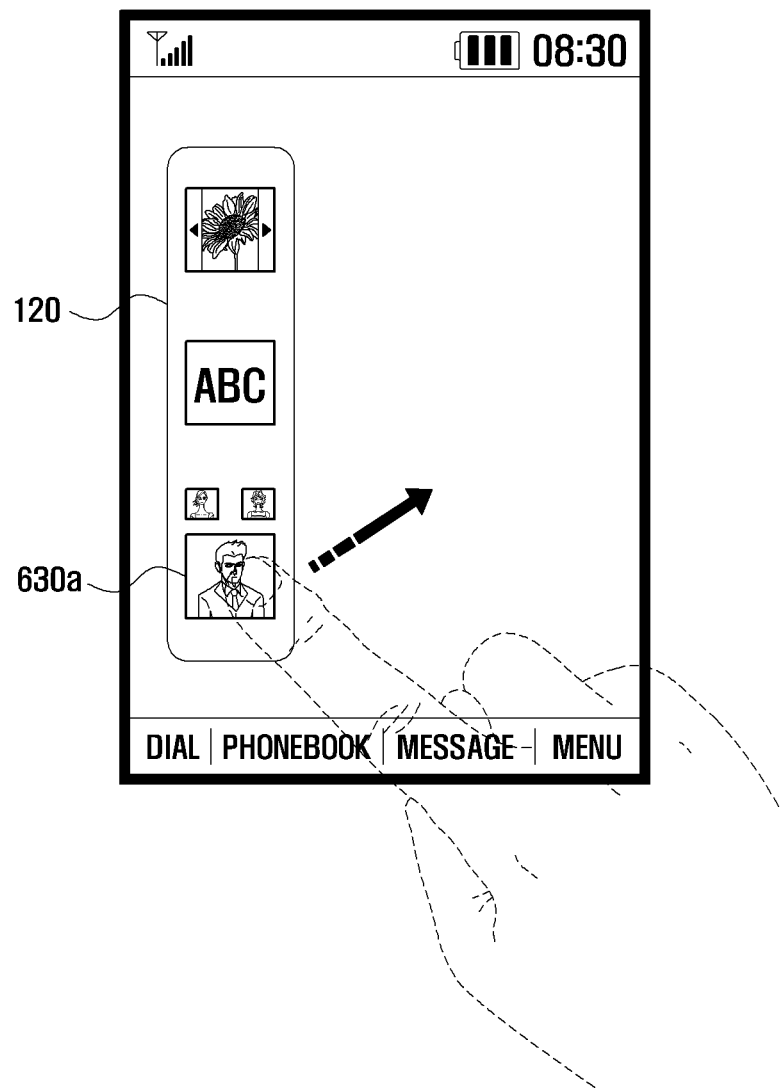
FIGS. 6e and 6f are diagrams illustrating a process of activating a function matched with an icon placed on a toolbar in a toolbar menu mode screen according to an exemplary embodiment of the present invention.
Figure 6F:
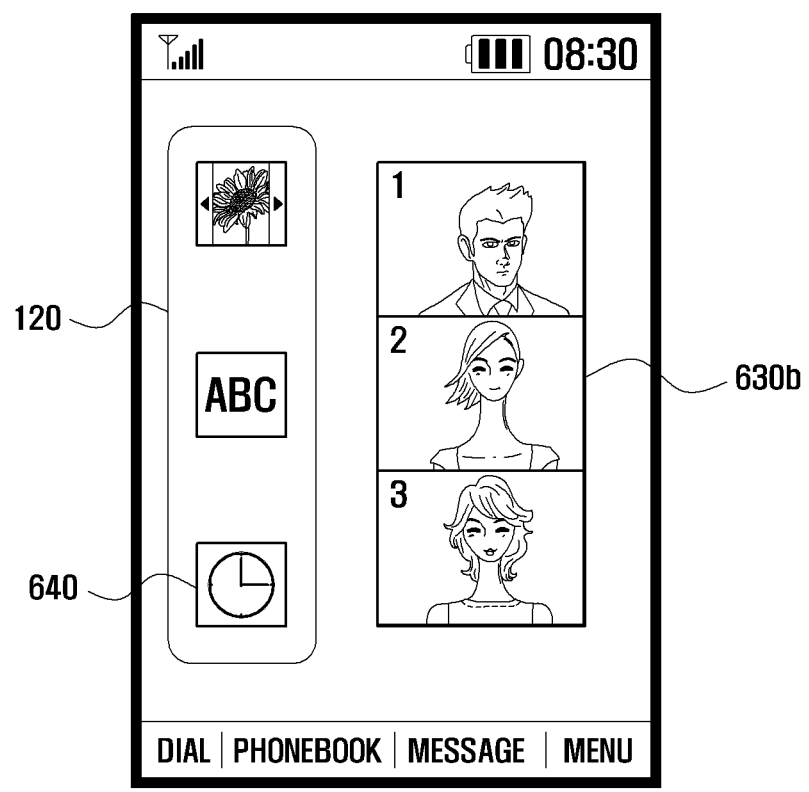

FIGS. 6e and 6f are diagrams illustrating a process of activating a function matched with an icon placed on a toolbar in a toolbar menu mode screen according to an exemplary embodiment of the present invention.

As shown in FIG. 6e, if the user drags a specific icon 630a from the toolbar 120 and drops the icon 630a in the first region, the toolbar driver 370b looks up a matching table stored as the setting information file and activates the function matched with the icon 630a in the matching table. Here, the control unit 370 controls such that, when an icon 630a is dragged out of the toolbar 120 and its corresponding function 630b is executed on the first region, another function icon 640 is placed at the position as shown in FIG. 6f. The function icon 640 replacing the icon 630a can be selected from candidate function icons registered for the toolbar 120.

Figure 6G:
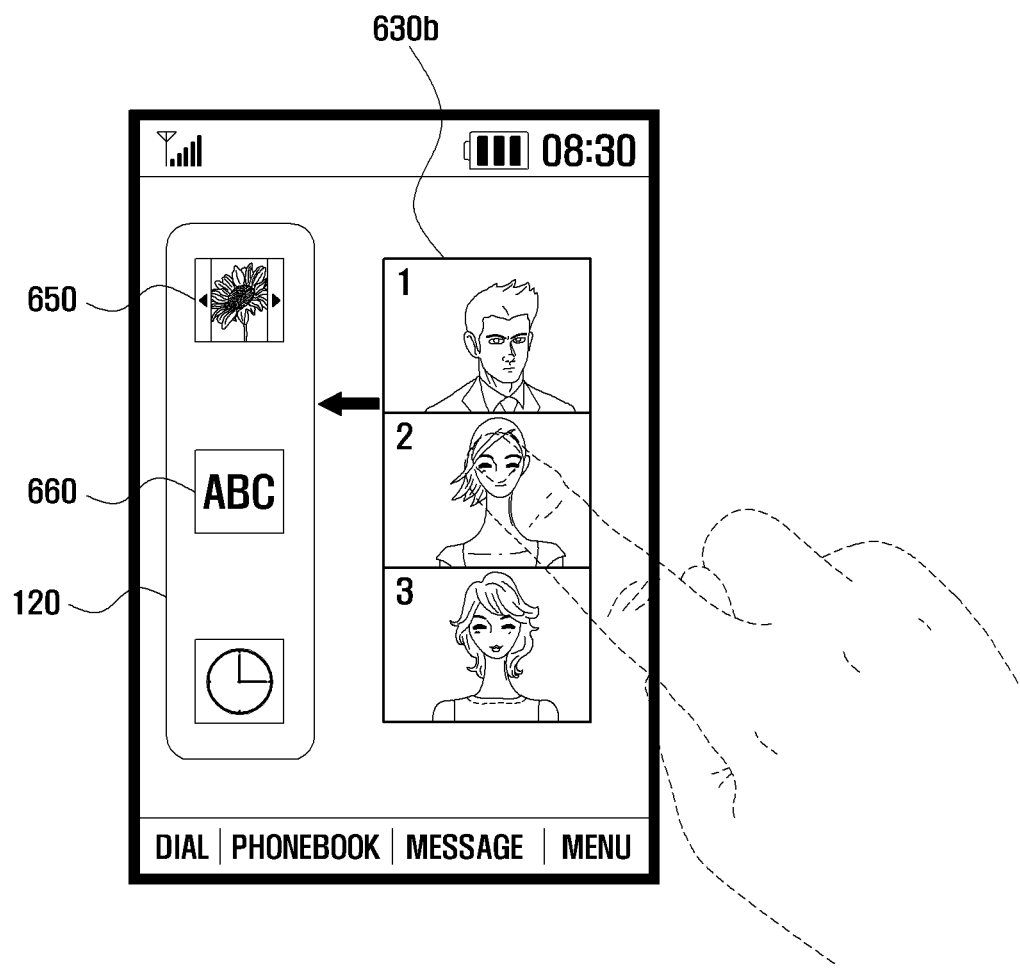
FIGS. 6g and 6h are diagrams illustrating a process of deactivating an active function in a toolbar menu mode screen according to an exemplary embodiment of the present invention.
Figure 6H:
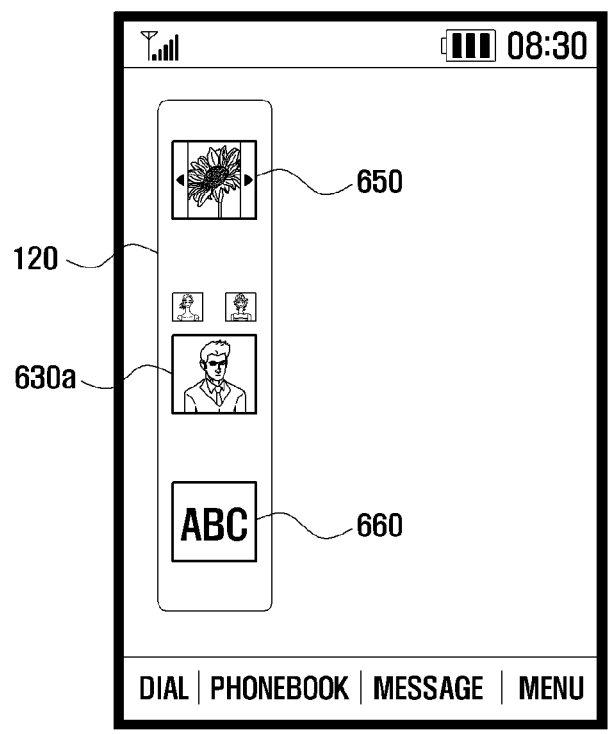

FIGS. 6g and 6h are diagrams illustrating a process of deactivating an active function in a toolbar menu mode screen according to an exemplary embodiment of the present invention.

As shown in FIG. 6g, the user can drag an active function object from the main window and drop the active function object on the toolbar 120. In this case, the toolbar driver 370 controls such that the icon matched with the active function object retrieved from the setting information file is placed on the toolbar 120.

For example, if the user drags an active function object 630b from the main window and drops the active function object 630b between the icons 650 and 660 on the toolbar 120, then an icon 630a matched with the active function object 630b is placed between the icons 650 and 660 as illustrated in FIG. 6h.

Figure 7:
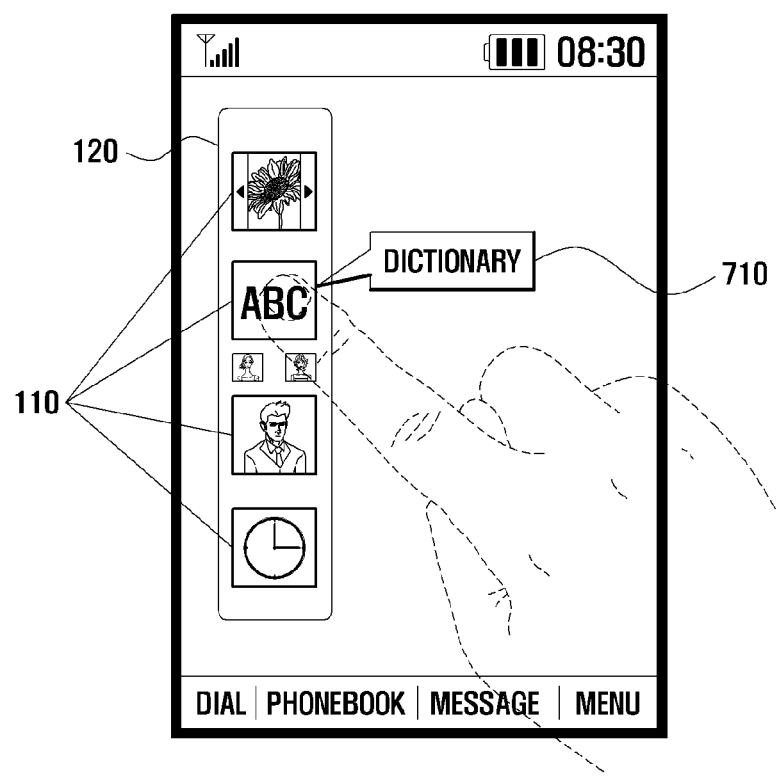
FIG. 7 is a diagram illustrating a process of informing of a function matched with an icon selected on a toolbar in a toolbar menu mode screen according to an exemplary embodiment of the present invention.

FIG. 7 is a diagram illustrating a process of informing of a function matched with an icon selected on a toolbar in a toolbar menu mode screen according to an exemplary embodiment of the present invention.

In some cases, the user may not recognize the functions associated with the respective icons 110 placed on the toolbar, upon first glance or due to poor eyesight.

Accordingly, in order to provide the user with information about the functions matched with the icons 110, the control unit 370 controls such that, when a touch is detected on an icon, the information on the function represented by the icon is presented in the form of a balloon text 710. As illustrated in FIG. 7, if the user touches on the "ABC" icon, then the control unit 370 controls such that a balloon text 710 is displayed with the text "Dictionary" to inform the user that the icon represents the dictionary function.

The additional information about the function represented by the selected icon may be provided by another method, e.g. with an enlarged icon or a voice announcement.

Accordingly, even when the user has poor eyesight or does not recognize the functions represented by the icons, it is possible to obtain the information on the functions associated with the icons by touching on the icons, resulting in improvement of user convenience.

Figure 8A:
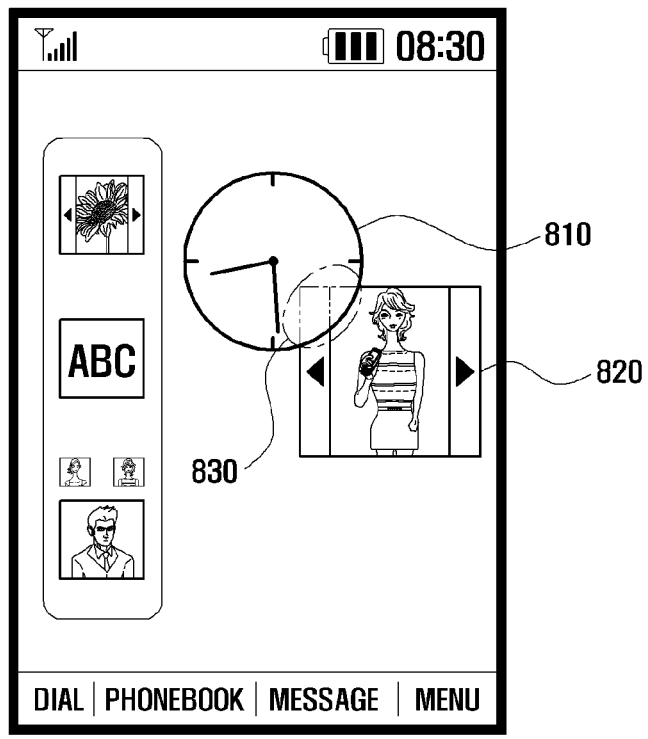
FIGS. 8a and 8b are diagrams illustrating a process of activating multiple functions in a toolbar menu mode screen according to an exemplary embodiment of the present invention.
Figure 8B:
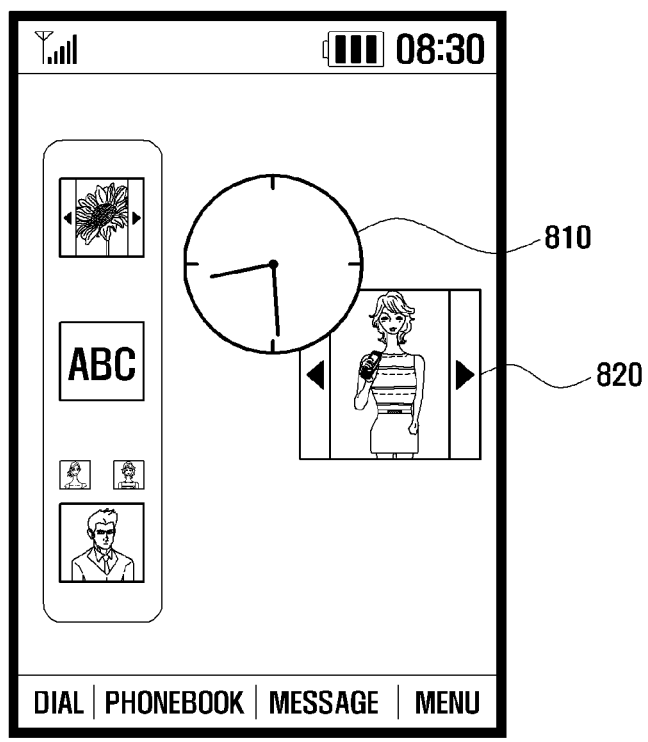

FIGS. 8a and 8b are diagrams illustrating a process of activating multiple functions in a toolbar menu mode screen according to an exemplary embodiment of the present invention.

Since the first region 130 of the toolbar menu mode screen is limited in size, the active function objects 810 and 820 that are activated by moving their corresponding icons from the toolbar to the first region 130 are allowed to be overlappingly displayed within the first region 130.

In FIG. 8a, the first active function object 810 is partially overlapped with the second active function object 820. In this case, the first and second active function objects 810 and 820 can be adjusted in transparency under the control of the control unit 370 such that, even when the first and second active function objects are overlapped, the user can acquire the information provided by both the first and second active function objects simultaneously.

FIG. 8b shows another exemplary situation in which two active function objects 810 and 820 are overlappingly displayed in the first region 130. In this case, the first and second active function objects 810 and 820 are presented opaquely such that the second active function object 820 is hidden by the first active function object 810 at the overlapped portion.

Figure 9:
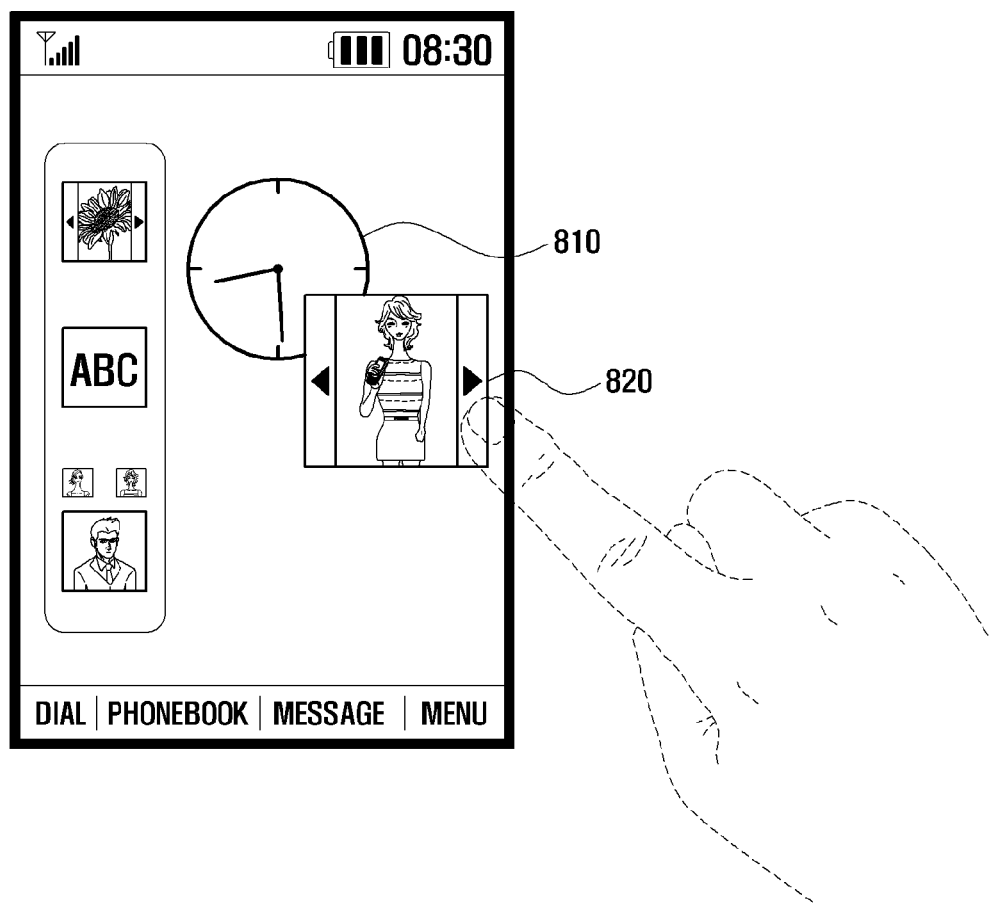
FIG. 9 is a diagram illustrating a process of realigning active function objects in a toolbar menu mode screen according to an exemplary embodiment of the present invention.

FIG. 9 is a diagram illustrating a process of realigning active function objects in a toolbar menu mode screen according to an exemplary embodiment of the present invention. In FIG. 9, two active function objects 810 and 820 are overlappingly arranged on different depth planes in the toolbar menu mode screen.

If the second active function object 820 is selected by a touch event while the first active function object 810 overlies the second active function object 820 as shown in FIGS. 8a and 8b, the control unit 370 controls such that the second active function object 820 is placed on a higher plane such that the second active function object 820 overlies the first active function object 810.

In this case, the control unit can control such that some parts of the first active function object 810 (in FIG. 9, a hour hand and a minute hand of a clock) are placed on the higher plane to improve readability of information provided by the first active function object 810 (in FIG. 9, present time of the clock) even though the first active function object 810 is placed on a lower plane.

Figure 10A:
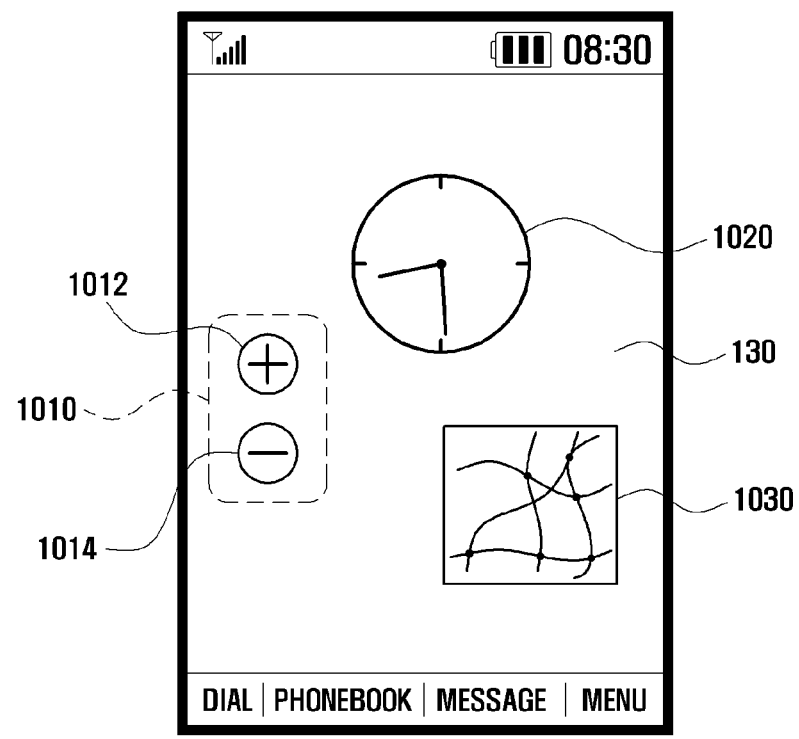
FIGS. 10a and 10b are diagrams illustrating a process of zooming in on an active function object in a toolbar menu mode screen according to an exemplary embodiment of the present invention.
Figure 10B:
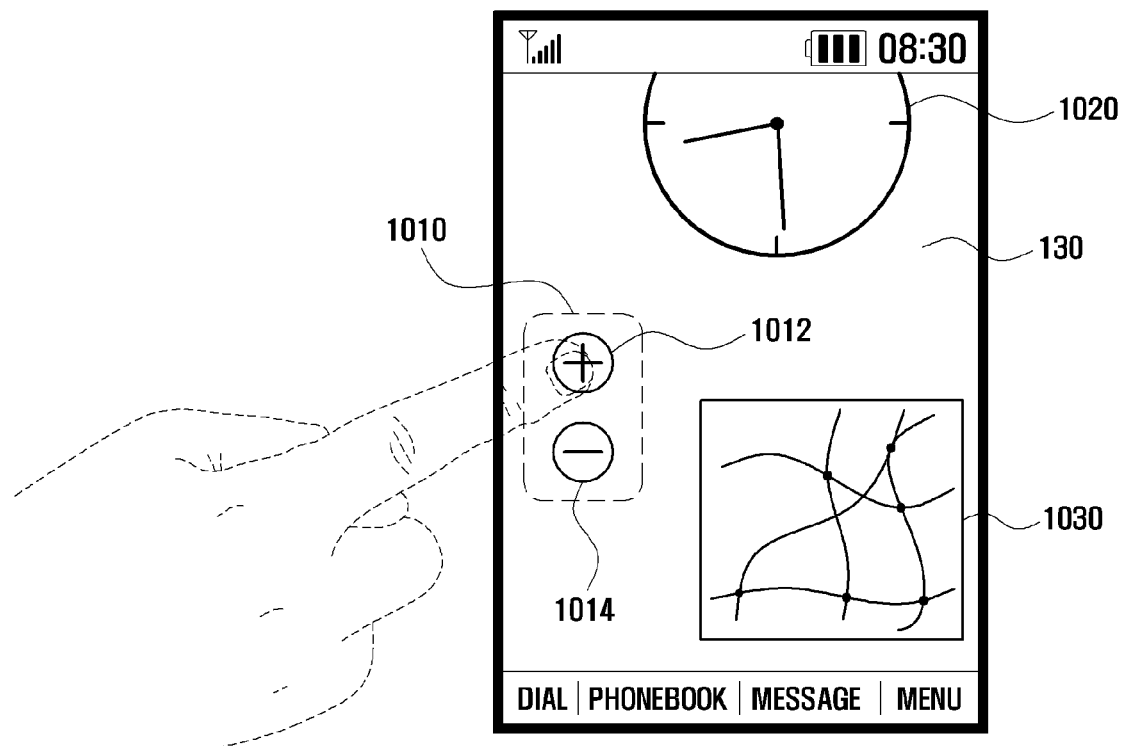
Figure 10C:
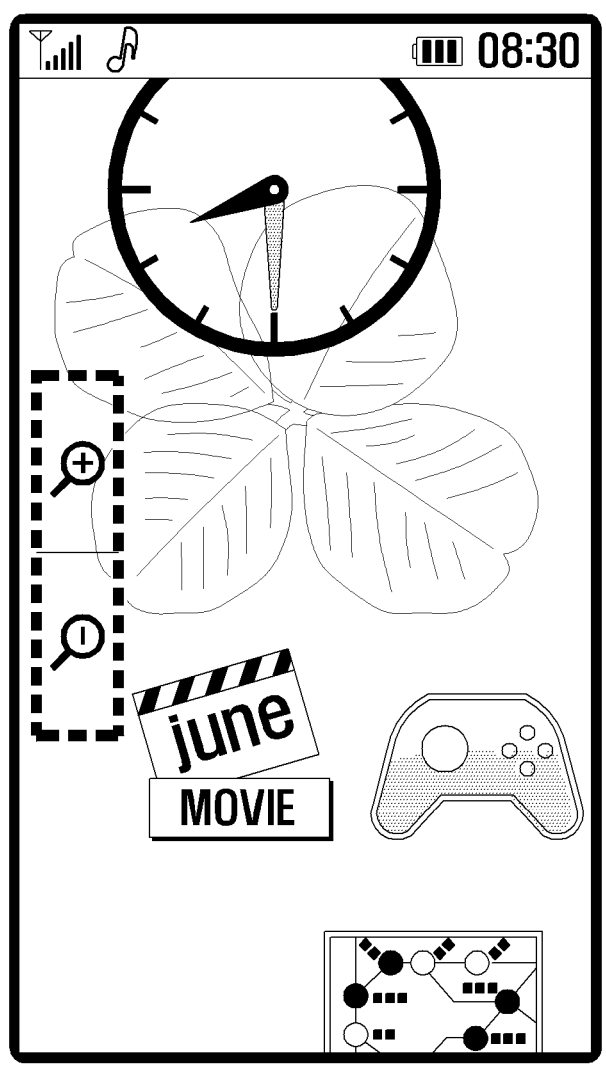
FIG. 10c is a screenshot illustrating a toolbar menu mode screen shown in the zooming-in process of FIGS. 10a and 10b.

FIGS. 10a and 10b are diagrams illustrating a process of zooming in on an active function object in a toolbar menu mode screen according to an exemplary embodiment of the present invention, and FIG. 10c is a screenshot illustrating a toolbar menu mode screen shown in the zooming-in process of FIGS. 10a and 10b.

As shown in FIG. 10a, a clock 1020 as the first active function object and a subway map 1030 as the second active function object are presented in the first region 130 of the toolbar menu mode screen. Since the clock is provided in the form of a simple image and the information (present time) provided by the clock is also relatively simple, the user can read the information (present time) with no difficulty. However, the subway map 1030 includes much information (including stations, junction stations, types of subway lines, and stop-by stations), making it difficult for the user to read the information on the subway map 1030 as it is displayed.

In this exemplary embodiment, when a zoomable active function object (e.g. subway map 1030) is selected by touch, a zoom function object 1010 having zoom-in and zoom-out buttons 1012 and 1014 is activated.

If a touch is detected on the zoom-in button 1012, then the control unit 370 controls to zoom in on the zoomable active function object. In the example as shown in FIG. 10b, the user can zoom in on the subway map 1030 by touching the zoom-in button 1012 such that the user can read information that is difficult to see before the subway map 1030 is zoomed in. In this manner, the user can acquire the information such as a station name, junction stations, subway lines, and stop-by stations from the subway map 1030. Also, while the subway map 1030 is zoomed, the user can more easily navigate on the subway map 1030.

The control unit 370 also can control such that, when a touch is detected on the zoom-in button 1012, the first region 130 is zoomed in at a certain percentage. In this case, when a touch is detected on the zoom-out button 1014, the control unit 370 controls such that the first region 130 is zoomed out at the certain percentage.

As shown in FIG. 10c, the toolbar menu mode screen is provided with the zoom-in and zoom-out buttons 1012 and 1014, and the first region 130 is zoomed in by touch on the zoom-in button 1012.

Using the zoom-in and zoom-out buttons 1012 and 1014, the user can zoom in and out the first region 130 at a certain percentage.

Figure 11:
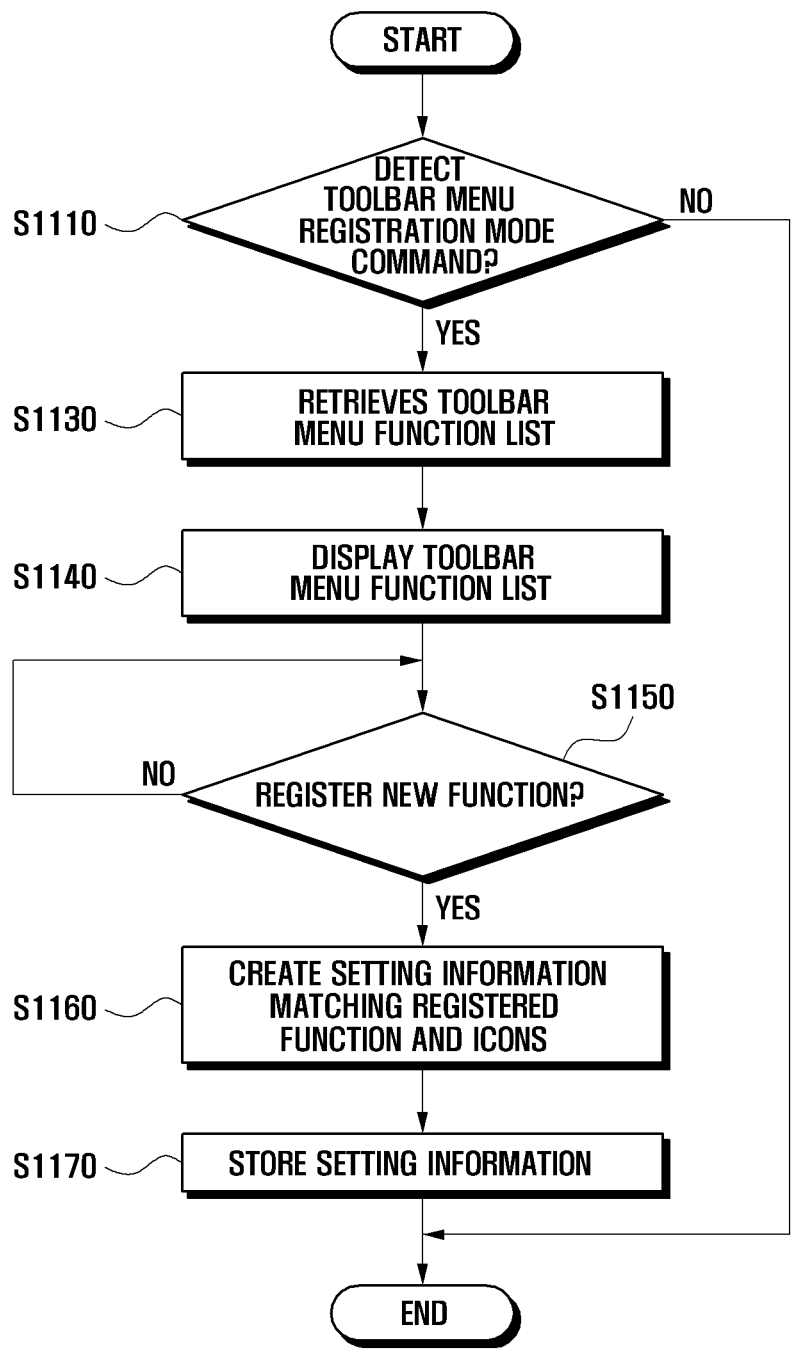
FIG. 11 is a flowchart illustrating a procedure of registering functions with a toolbar in a user interface method according to an exemplary embodiment of the present invention.

FIG. 11 is a flowchart illustrating a procedure of registering functions with a toolbar in a user interface method according to an exemplary embodiment of the present invention.

Referring to FIG. 11, the control unit 370 of the mobile terminal determines whether a toolbar menu registration mode command is detected in step S1110.

If a toolbar menu registration mode command is detected, the control unit 370 retrieves a toolbar menu function list listing the functions that can be registered with the toolbar in step S1130 and displays the functions in step S1140. In an exemplary embodiment, the functions may be displayed with check boxes as illustrated in FIG. 5 or other selection options. While displaying the functions, the control unit 370 determines if one of the functions is selected for registration in step S1150. For example, the user can select the functions to be registered with the toolbar by marking on the check boxes provided with the functions. If a function is selected, the control unit 370 creates (or updates) setting information, i.e. a matching table (see table 1) in which a function icon is matched with the function selected by the user in step S1160, and stores the matching table in the storage unit 350 in step S1170.

Figure 12:
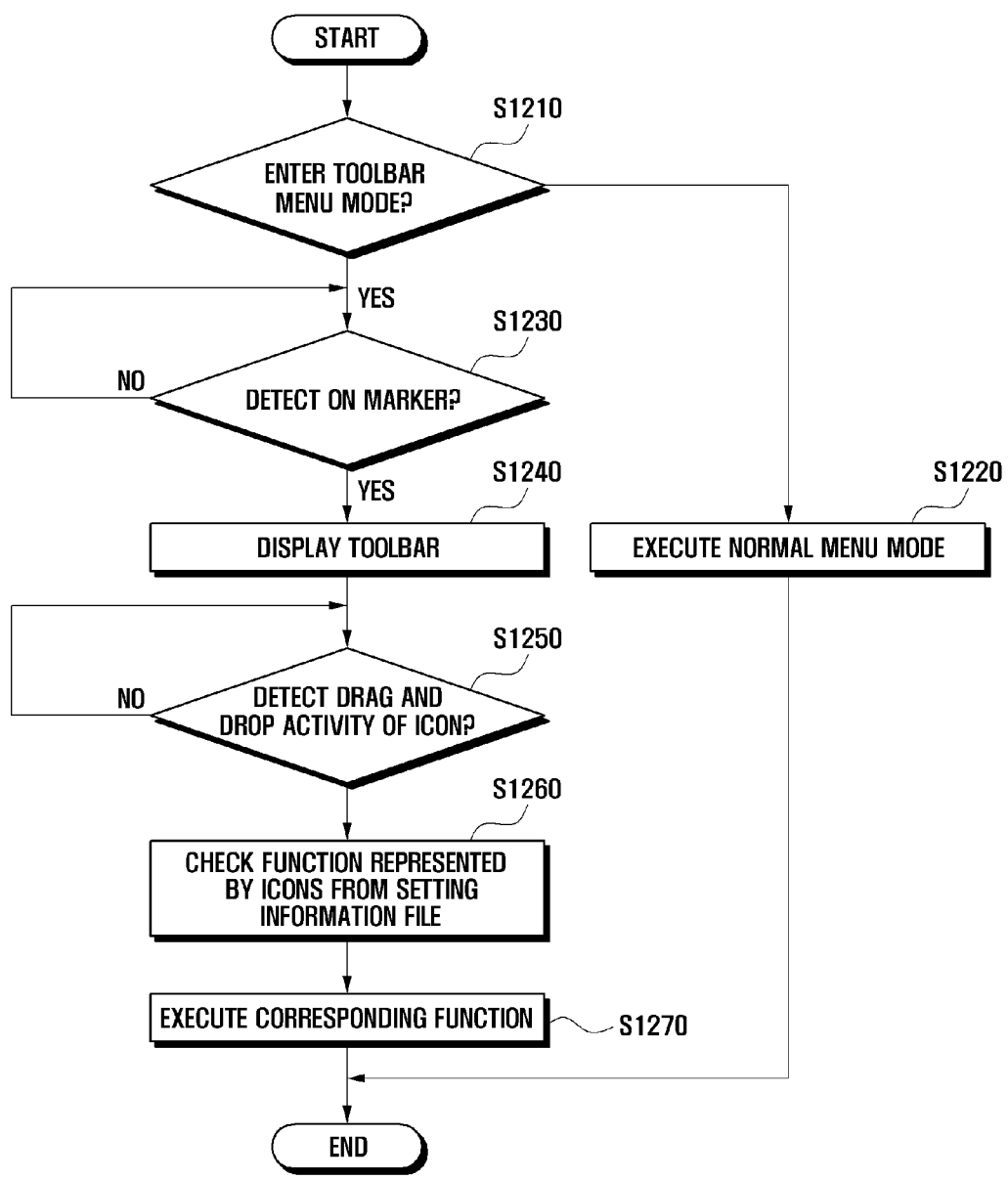
FIG. 12 is a flowchart illustrating a procedure of activating a function registered with a toolbar in a user interface method according to an exemplary embodiment of the present invention.

FIG. 12 is a flowchart illustrating a procedure of activating a function registered with a toolbar in a user interface method according to an exemplary embodiment of the present invention.

Referring to FIG. 12, the control unit 370 determines whether the mobile terminal is operating in a toolbar menu mode in step S1210. If the mobile terminal is not operating in the toolbar menu mode, then the control unit 370 determines that the mobile terminal is operating in a normal menu mode and controls to provide a normal menu mode service in step S1220.

Otherwise, if it is determined that the mobile terminal is operating in the toolbar menu mode in step S1210, the control unit waits for the detection of a touch on a marker provided on a toolbar menu mode screen in step S1230. If a touch on the marker is detected, the control unit checks the functions registered with the toolbar and controls such that the toolbar on which the icons matched with the functions are placed is presented in the toolbar menu mode screen in step S1240. In a case that the toolbar menu mode screen is provided without the marker, the control unit checks the functions registered with the toolbar and presents the toolbar in the toolbar menu mode screen together with the icons matched with the functions, in response to a detection of a touch at any position on the touchscreen. In an exemplary implementation, the position can be a predetermined position or an empty area having no icon.

Next, the control unit determines whether an icon placed on the toolbar is dragged and dropped in a main window 130 of the toolbar menu mode screen in step S1250. If it is detected that an icon is dragged from the toolbar and dropped in the main window 130, the control unit checks the function matched with the icon with reference to the matching table in step S1260 and activates the function matched with the icon in the main window in step S1270.

The user interface methods according to second to fifth exemplary embodiments of the present invention are described with reference to FIGS. 13a and 13b, 14, 15a to 15c, 16, 17a to 17c, 18, 19a to 19c, and 20.

Second Exemplary Embodiment

Figure 13A:
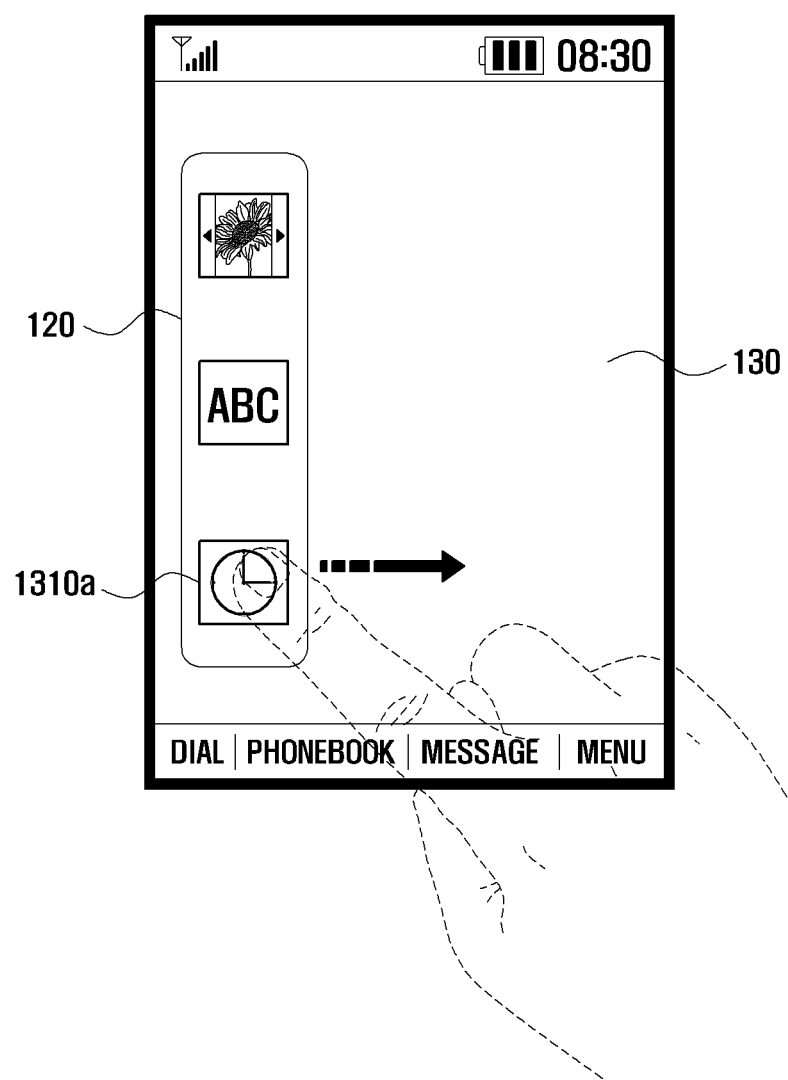
FIGS. 13a and 13b are diagrams illustrating operations of a function in a toolbar menu mode of a user interface method according to an exemplary embodiment of the present invention.
Figure 13B:
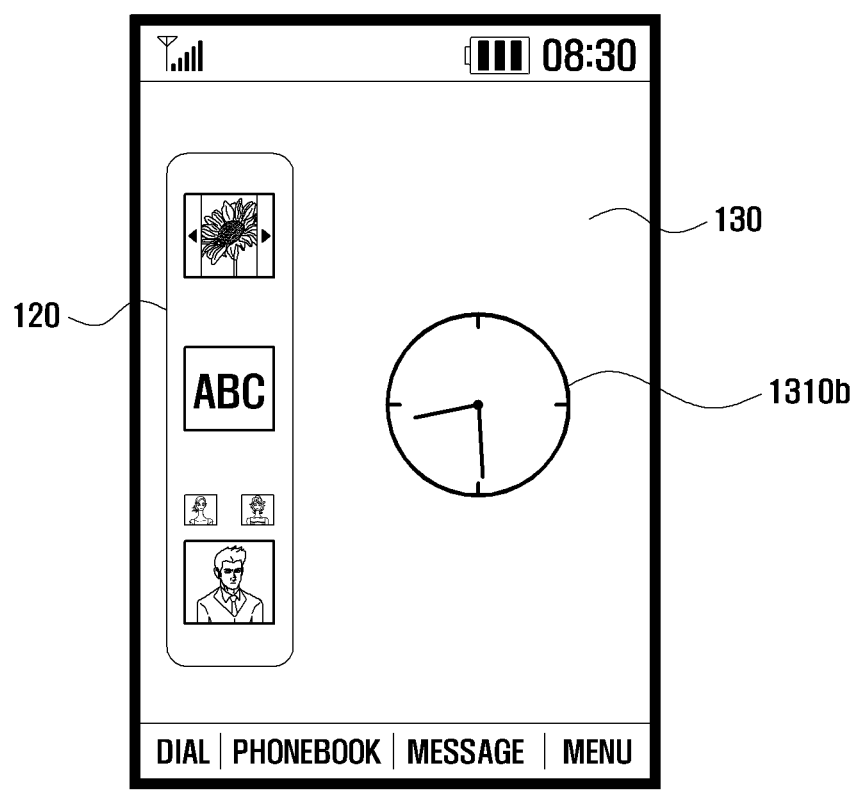

FIGS. 13a and 13b are diagrams illustrating operations of a function in a toolbar menu mode of a user interface method according to an exemplary embodiment of the present invention. In this exemplary embodiment, the function execution process is described with reference to activation of a clock function by dragging a clock icon representing the clock function from a toolbar and dropping the clock icon in a main window of the toolbar menu mode screen.

As shown in FIG. 13a, the clock icon 1310a representing the clock function showing the present time is placed on the toolbar 120. If the clock icon 1310a is dragged from the toolbar 120 and dropped in the main window 130, the control unit 370 detects the movement of the clock icon and checks the clock function matched with the clock icon 1310a from a matching table (setting information file). Next, the control unit 370 activates the clock function such that an active clock function object 1310b indicating the present time appears in the main window 130 as shown in FIG. 13b. In this exemplary embodiment, the active clock function object 1310b may appear in the form of an analog clock image or a digital clock image.

Figure 14:
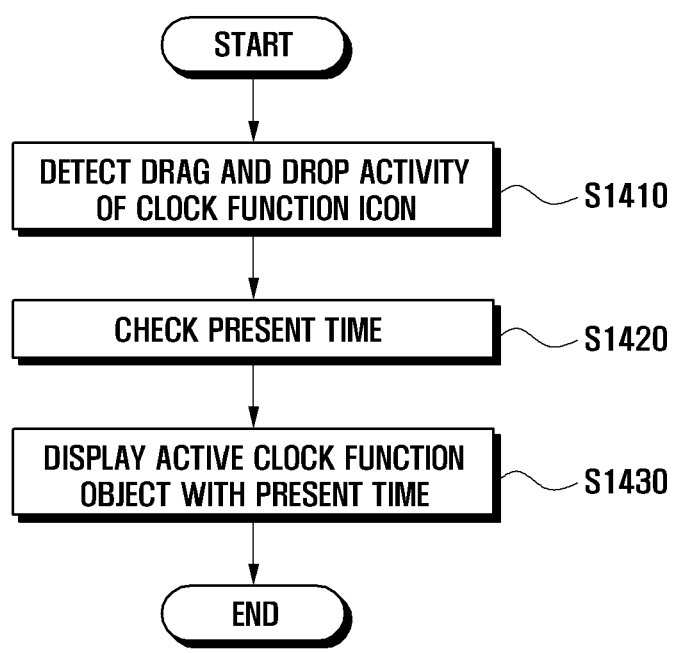
FIG. 14 is a flowchart illustrating an exemplary function execution process of FIGS. 13a and 13b.

FIG. 14 is a flowchart illustrating an exemplary function execution process of FIGS. 13a and 13b.

Referring to FIGS. 13a, 13b, and 14, the control unit 370 detects the movement of the clock icon 1310a from the toolbar 120 to the main window 130 in step S1410. The control unit 370 recognizes the clock function matched with the clock function icon and checks the present time in step S1420. Finally, the control unit 370 displays the active clock function object 1310b indicating the present time in the main window 130 in step S1430.

Third Exemplary Embodiment

Figure 15A:
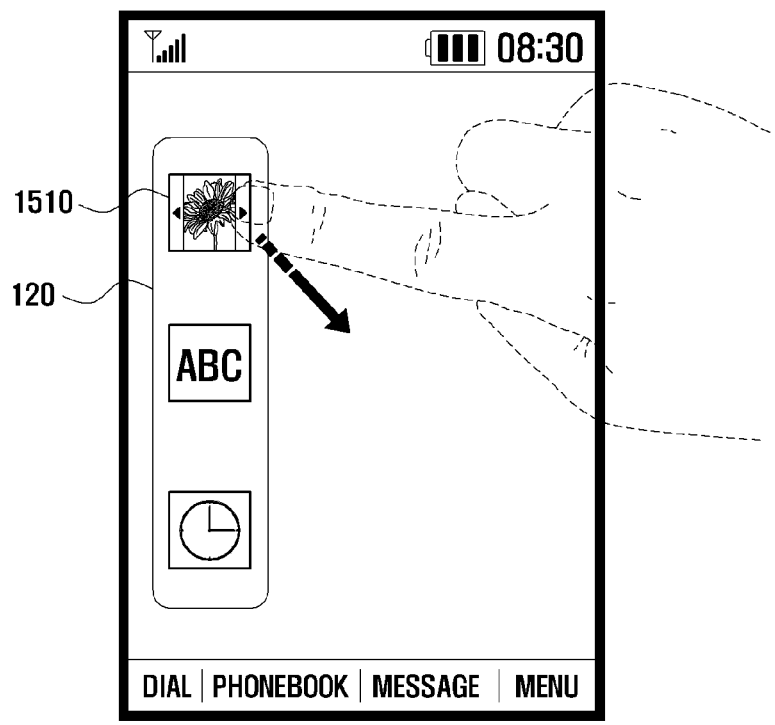
FIGS. 15a to 15c are diagrams illustrating operations of a function in a toolbar menu mode of a user interface method according to an exemplary embodiment of the present invention.
Figure 15B:
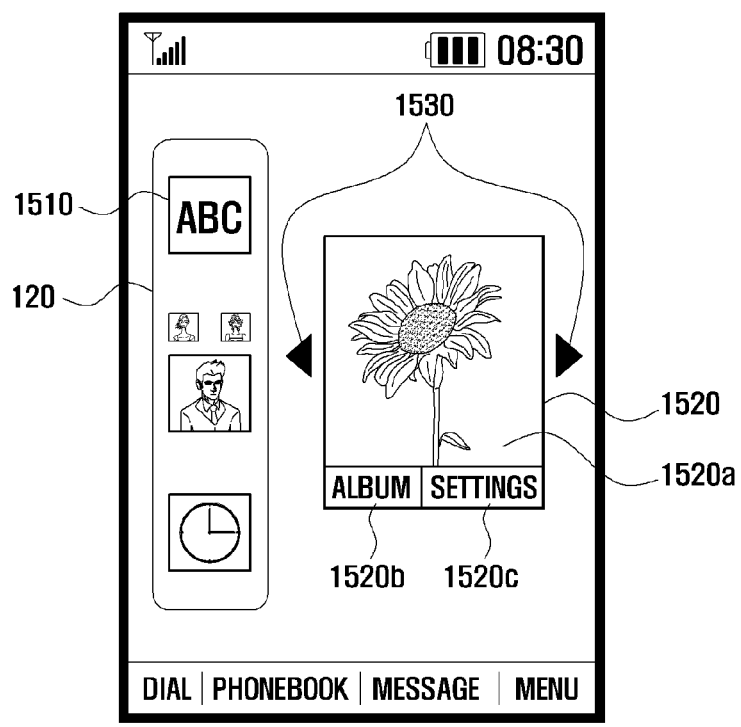
Figure 15C:
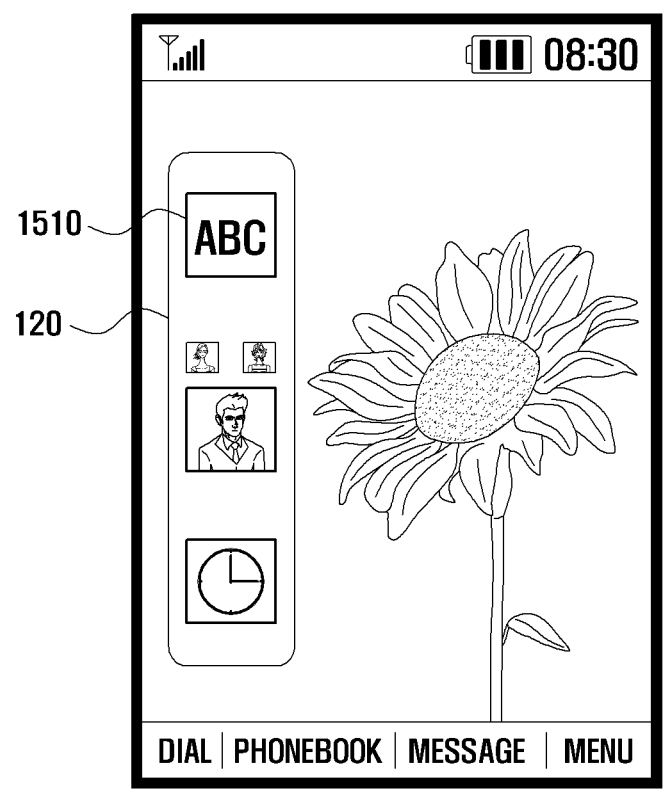

FIGS. 15a to 15c are diagrams illustrating operations of a function in a toolbar menu mode of a user interface method according to an exemplary embodiment of the present invention. In this exemplary embodiment, the function execution process is described with reference to activation of a photo album function by dragging a photo album icon representing the photo album function from the toolbar and dropping the photo album icon in the main window.

As shown in FIG. 15a, the photo album icon 1510 representing the photo album function is placed on the toolbar 120. If the photo album icon 1510 is dragged from the toolbar 120 and dropped in the main window 130, the control unit 370 detects the movement of the photo album icon and checks the photo album function matched with the photo album icon 1510 with reference to the matching table. Next, the control unit 370 activates the photo album function such that an active photo album function object 1520 appears in the main window 130 as shown in FIG. 15b. In the illustrated example of FIG. 15b, the active photo album function object 1520 is composed with a presentation window 1520a for presenting a photo stored with the photo album function and album and settings buttons 1520b and 1520c, respectively for executing sub-functions associated with the photo album function. The album button 1520b can be configured as a button for switching between folders containing photos, and the settings button 1520c can be configured as a button for selecting a photo provided by the photo album function as a background image of the mobile terminal.

The active photo album object 1520 is provided with a pair of navigation buttons such that, when a touch is detected on one of the navigation buttons, the control unit 370 controls such that the photo presented in the presentation window is shifted in a direction indicated by the touched navigation button. Also, when a touch is detected on the album button 1520b, the control unit controls such that a folder list is presented for selecting a folder from the folder list.

Also, when a touch is detected on the setting button 1520c, the control unit 370 controls such that the current image presented in the presentation window 1520a is set to be the background image of the mobile terminal as shown in FIG. 15c.

Figure 16:
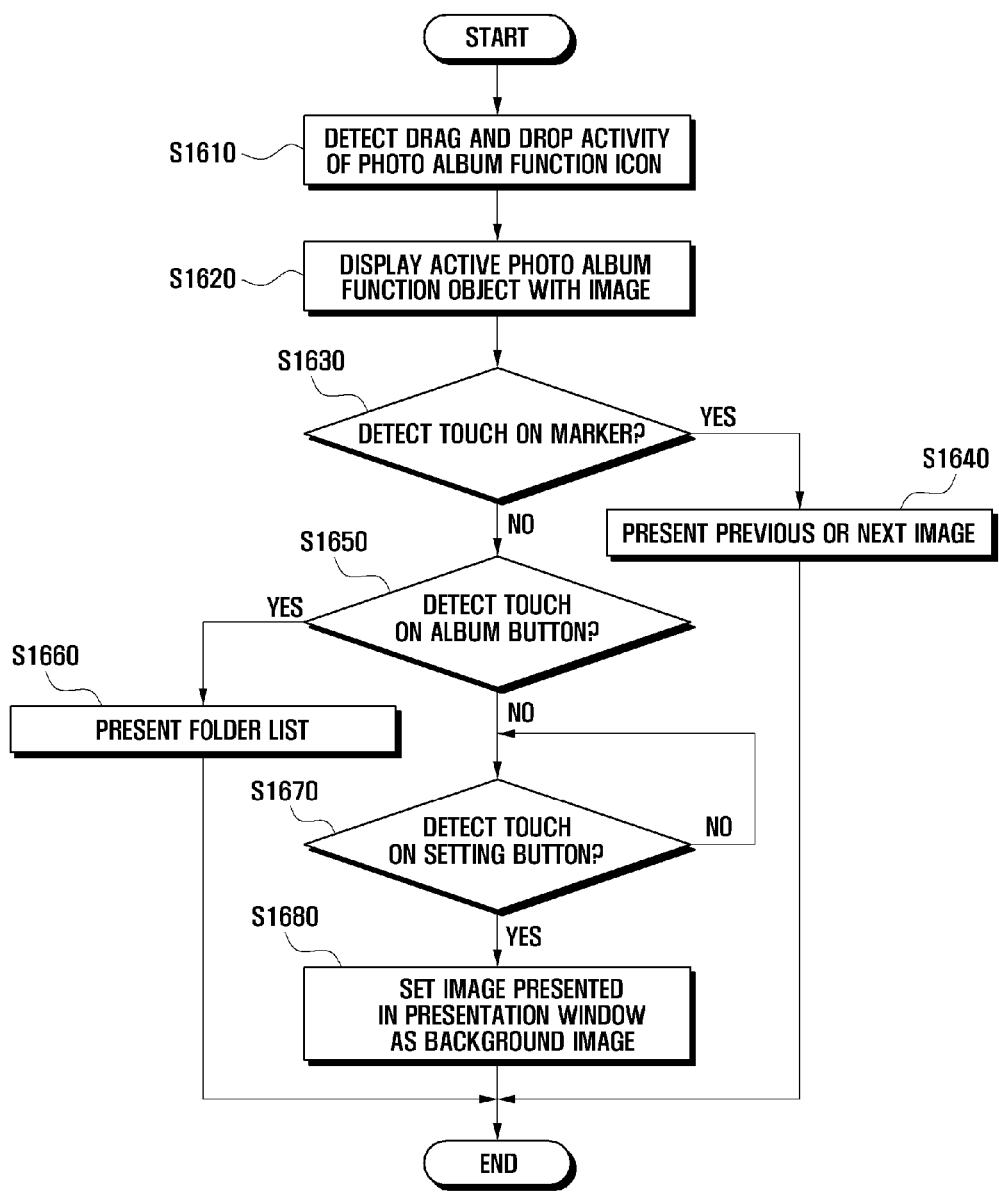
FIG. 16 is a flowchart illustrating an exemplary function execution process.

FIG. 16 is a flowchart illustrating an exemplary function execution process.

Referring to FIGS. 15a to 15c and 16, the control unit 370 detects the movement of the photo album function icon 1510 from the toolbar 120 to the main window 130 in step S1610 and presents an image registered with the photo album function represented by the photo album function icon 1510 in step S1620. The control unit 370 detects a touch on the touchscreen panel 360b and determines whether the touch is detected on a navigation button 1530 in step S1630. If the touch is detected on a navigation button 1530, the control unit 370 controls such that the image is shifted corresponding to the navigation button 1530 in step S1640. Otherwise, if the touch is not detected on the navigation buttons 1530, the control unit 370 determines whether a touch is detected on the album button 1520b of the photo album function object 1520 in step S1650. If the touch is detected on the album button 1520b, the control unit 370 controls such the folder list is presented in order for the user to select a folder from the folder list in step S1660. If the touch is not detected on the album button 1520b, the control unit 370 determines whether a touch is detected on the setting button 1520c in step S1670. If the touch is detected on the setting button 1520c, the control unit controls such that the current image presented in the presentation window 1520a is set for the background image of the mobile terminal in step S1680.

Fourth Exemplary Embodiment

Figure 17A:
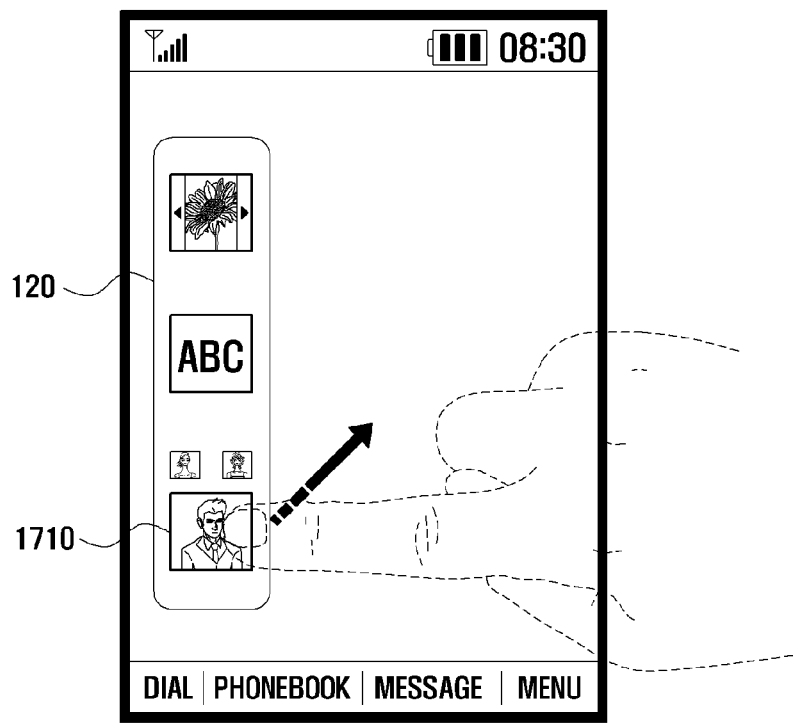
FIGS. 17a to 17c are diagrams illustrating operations of a function in a toolbar menu mode of a user interface method according to an exemplary embodiment of the present invention.
Figure 17B:
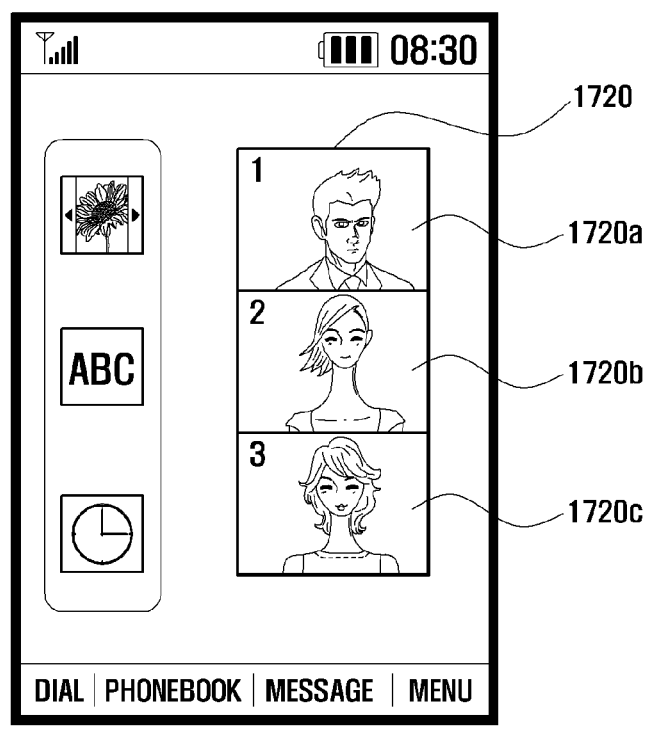
Figure 17C:
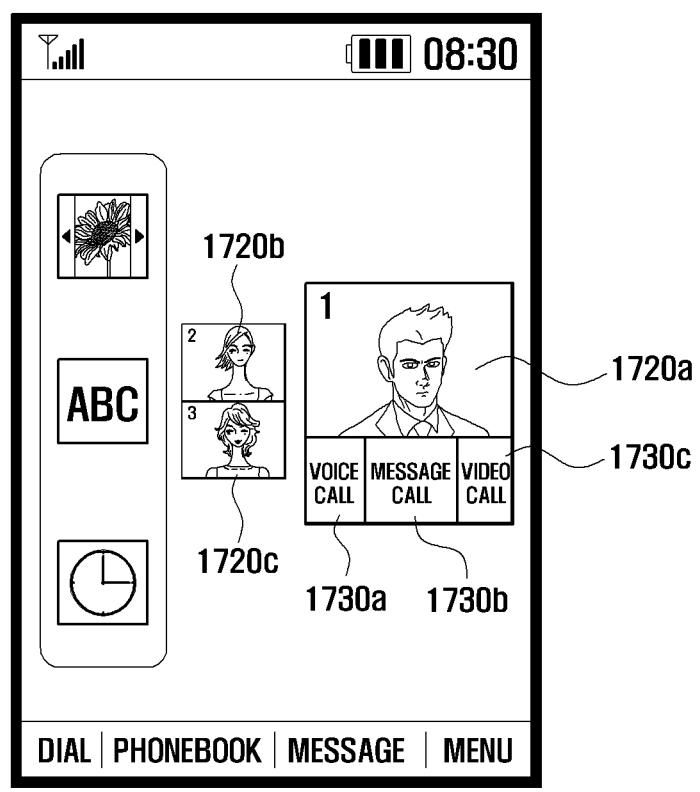

FIGS. 17a to 17c are diagrams illustrating operations of a function in a toolbar menu mode of a user interface method according to an exemplary embodiment of the present invention. In this example, the function execution process is described with reference to activation of a Top-3 function by dragging a Top-3 function icon representing the Top-3 function from the toolbar and dropping the Top-3 function icon in the main window.

The Top-3 function refers to a function for presenting information about registered members selected from a phonebook on the toolbar menu mode screen simultaneously such that the user can make a voice call, a video call, or a message call to the registered member immediately. In order to use the Top-3 function, the user must register the members for the Top-3 function. Also, it should be understood that the number of users is not limited to three but may include more or fewer users at the selection of the user.

As shown in FIG. 17a, the Top-3 function icon 1710 representing the Top-3 function is placed on the toolbar 120. If the Top-3 function icon 1710 is dragged from the toolbar 120 and dropped in the main window 130, the control unit 370 detects the movement of the Top-3 function icon 1710 and checks the Top-3 function match with the Top-3 function icon 1710 with reference to the matching table. Next, the control unit 370 activates the Top-3 function such that an active Top-3 function object 1720 appears in the main window 130 as shown in FIG. 17b. The active Top-3 function object 1720 is composed of three presentation windows 1720a, 1720b, and 1720c for presenting images associated with the registered members. The three presentation windows 1720a, 1720b, and 1720c can be aligned in the vertical or horizontal direction. In FIG. 17b for example, the three presentation windows 1720a, 1720b, and 1720c are aligned in vertical direction. The control unit 370 controls such that the three presentation windows 1720a, 1720b, and 1720c present images set in association with the individual registered members. When a touch is detected on one of the three presentation windows 1720a, 1720b, and 1720c, the control unit 370 controls such that the touched presentation window is enlarged by a certain percentage. At this time, the enlarged presentation window is presented with submenu buttons 1730a, 1730b, and 1730c, and the other two presentation windows are arranged at one side of the enlarged presentation window as illustrated in FIG. 17c.

If the touch is detected on a first presentation window 1720a, then the control unit 370 controls such that the first presentation window 1720a is enlarged by the certain percentage together with the submenu buttons 1730a, 1730b, and 1730c at the bottom side of the enlarged presentation window 1720a, as shown in FIG. 17c. In this exemplary embodiment, the submenu buttons are designated for a voice call button 1730a, a message button 1730b, and a video call button 1730c. When a touch is detected on the voice call button 1730a, the control unit 370 controls such that a voice call is made to the phone number registered with the image presented on the enlarged presentation window. Of course, the submenu buttons may be designated with other functions as supported by the mobile terminal or as otherwise appropriate for the function.

As shown in FIG. 17c, the control unit 370 also controls such that the two other presentation windows 1720b and 1720c are arranged at one side of the enlarged presentation window 1720a.

Figure 18:
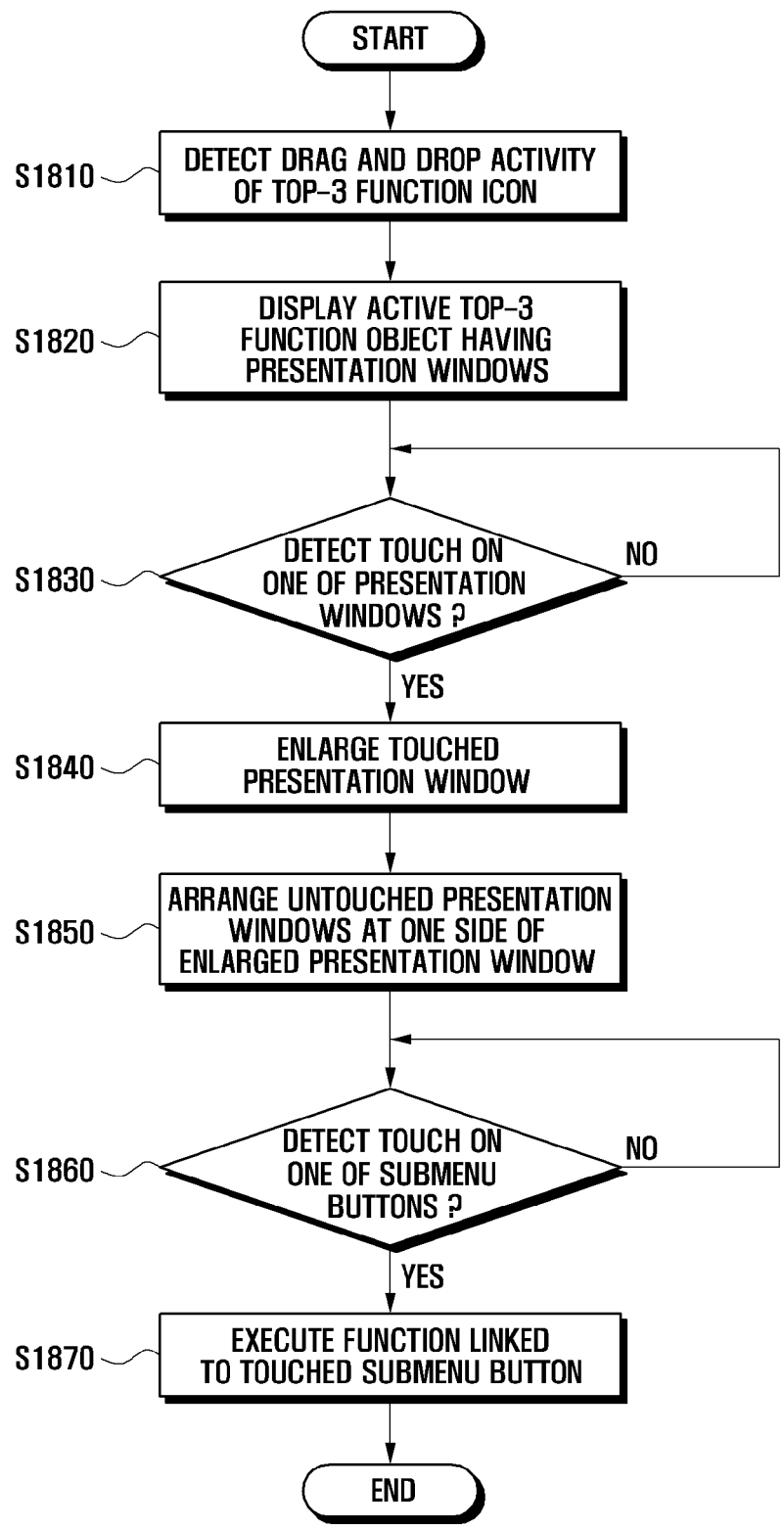
FIG. 18 is a flowchart illustrating an exemplary function execution process.

FIG. 18 is a flowchart illustrating an exemplary function execution process of FIGS. 17a to 17c.

Referring to FIGS. 17a to 17c and 18, the control unit 370 detects the movement of the Top-3 function icon 1710 from the toolbar 120 to the main window 130 in step S1810 and displays an active Top-3 function object 1720 having presentation windows 1720a, 1720b, and 1720c presenting individual images associated with the members registered for the Top-3 function in step S1820. The control unit 370 determines whether a touch is detected on any of the presentation windows 1720a, 1720b, and 1720c in step S1830. If a touch is detected on a presentation window, the control unit 370 controls such that the touched presentation window is enlarged by a certain percentage together with submenu buttons 1730a, 1730b, and 1730c in step S1840. Next, the control unit 370 controls such that the untouched presentation windows are arranged at one side of the enlarged presentation window in step S1850. Next, the control unit 370 determines whether a touch is detected on any of the submenu buttons 1730a, 1730b, and 1730c in step S1860. If a touch is detected on a submenu button, the control unit 370 controls such that a function linked to the touched submenu button is executed in step S1870.

Fifth Exemplary Embodiment

Figure 19A:
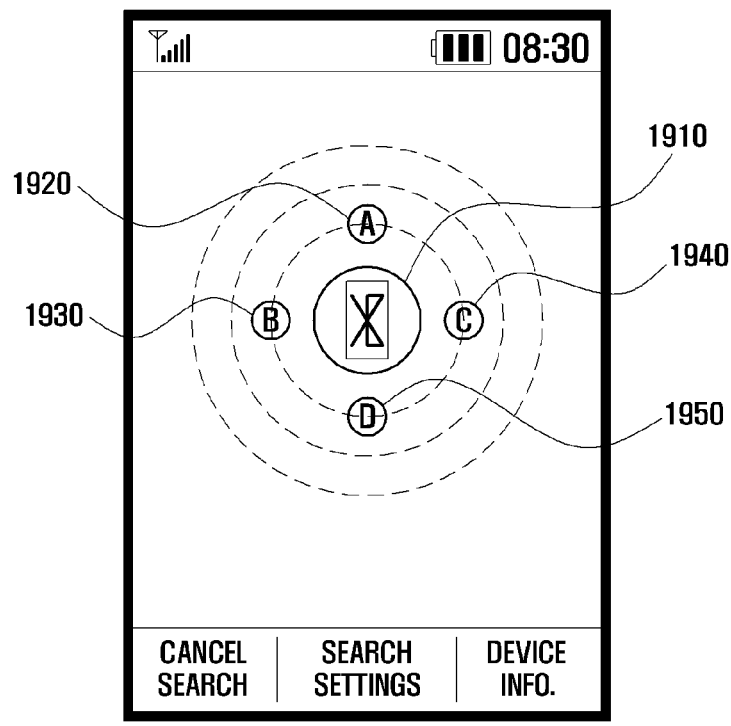
FIGS. 19a and 19b are diagrams illustrating operations of a function in a toolbar menu mode of a user interface method according to an exemplary embodiment of the present invention.
Figure 19B:
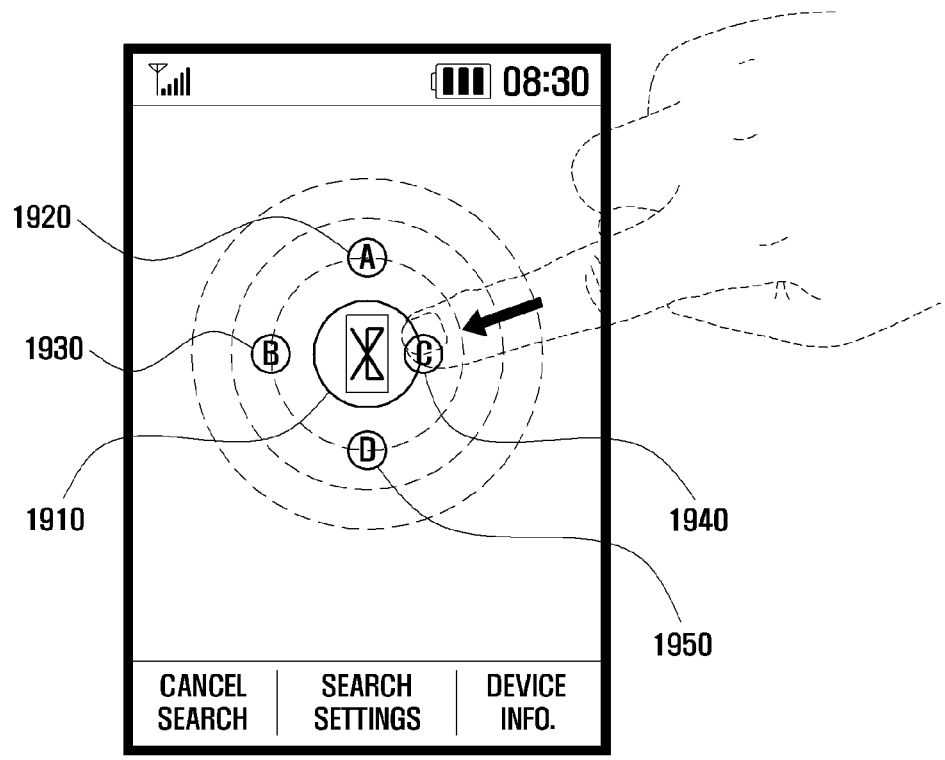
Figure 19C:
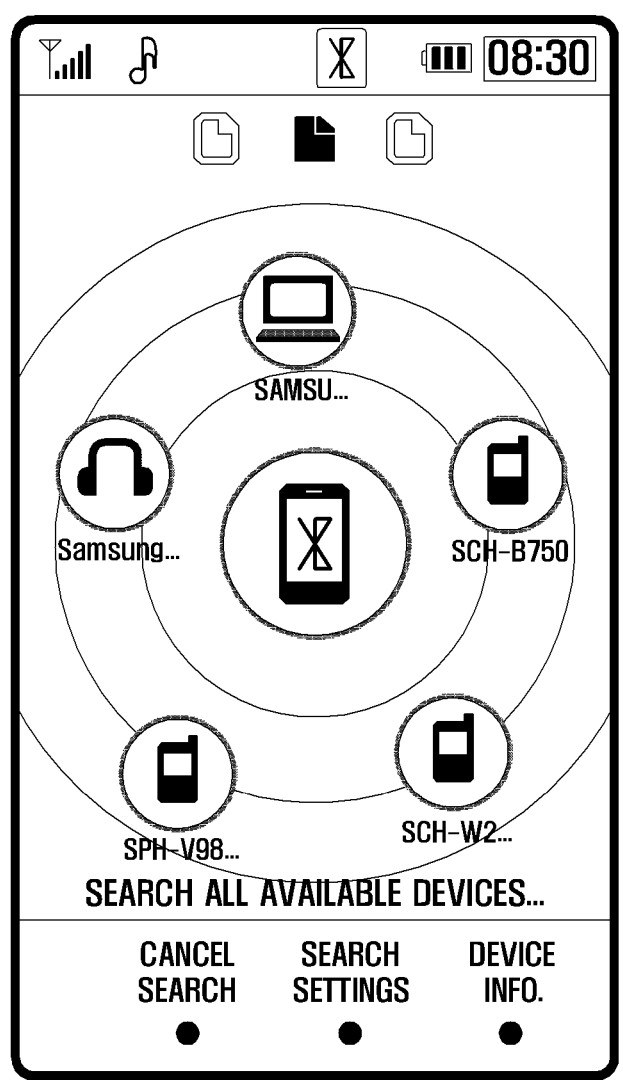
FIG. 19c is a screenshot illustrating a toolbar menu mode screen displayed in association of the function execution process of FIGS. 19a and 19b.

FIGS. 19a and 19b are diagrams illustrating operations of a function in a toolbar menu mode of a user interface method according to an exemplary embodiment of the present invention, and FIG. 19c is a screenshot illustrating a toolbar menu mode screen displayed in association of the function execution process of FIGS. 19a and 19b. In this example, the function execution process is described with reference to activation of a Bluetooth function. Since a Bluetooth link establishment procedure between the mobile terminal and a Bluetooth device is considered obvious to those skilled in the art, detailed description on the Bluetooth link establishment procedure is omitted for sake of convenience.

When the mobile terminal operates in a Bluetooth communication mode, the control unit 370 controls to scan the Bluetooth radio frequency to discover Bluetooth devices in its Bluetooth radio range. In the present example, the mobile terminal discovers four Bluetooth devices A, B, C and D within the Bluetooth radio range. Accordingly, the control unit controls to arrange the device icons 1920, 1930, 1940, and 1950 representing Bluetooth devices A, B, C and D discovered in the Bluetooth radio range around a Bluetooth function icon 1910, as shown in FIG. 19a.

If one (in this example, device icon 1940) of the device icons 1920, 1930, 1940, and 1950 is dragged and dropped on the Bluetooth function icon 1910 positioned at the center of a Bluetooth communication mode screen as shown in FIG. 19b, the control unit 370 detects the movement of the device icon 1940 and controls the Bluetooth unit 320 (see FIG. 3) such that the Bluetooth unit 320 establishes a Bluetooth link with the Bluetooth device C represented by the device icon 1940.

As shown in FIG. 19c, the Bluetooth devices discovered by the mobile terminal are arranged around the Bluetooth icon in the forms of device icons together with individual device names in a Bluetooth mode screen.

Figure 20:
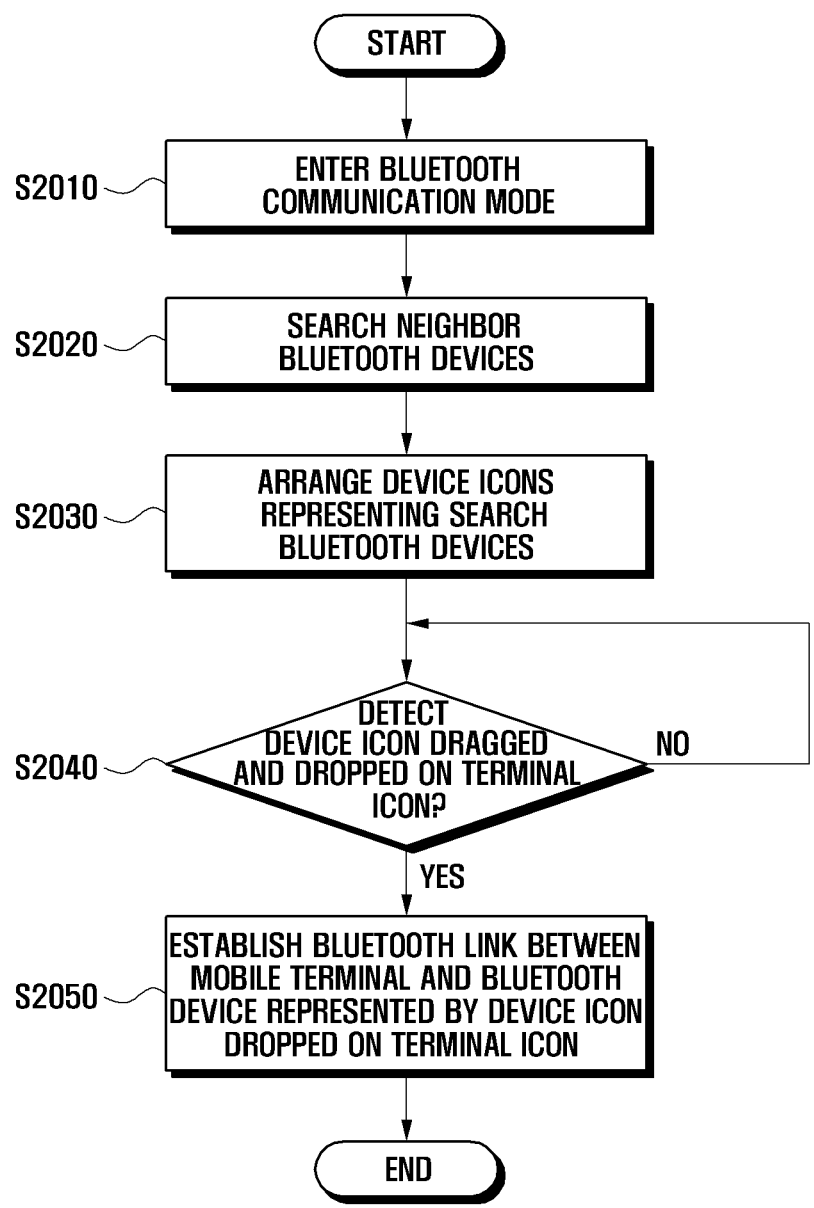
FIG. 20 is a flowchart illustrating an exemplary function execution process.

FIG. 20 is a flowchart illustrating an exemplary function execution process.

Referring to FIGS. 19a to 19c and 20, the control unit 370 detects that the mobile terminal enters the Bluetooth communication mode in step S2010 and scans the Bluetooth radio frequency to discover neighbor Bluetooth devices in step S2020. Sequentially, the control unit 370 arranges device icons 1920, 1930, 1940, and 1950 representing the discovered Bluetooth devices A, B, C, and D in step S2030. The control unit 370 determines whether any of the device icons 1920, 1930, 1940, and 1950 are dragged and dropped on the Bluetooth function icon 1910 arranged at the center of the Bluetooth communication mode screen in step S2040. If a device icon is dragged and dropped on the Bluetooth function icon 1910, the control unit 370 controls such that Bluetooth unit 320 (see FIG. 3) establishes a Bluetooth link between the mobile terminal and the Bluetooth device represented by the device icon in step S2050.

As described above, the user interface method and apparatus according to exemplary embodiments of the present invention enables activating a function by dragging an icon representing the function from a toolbar and dropping the icon on a main window provided in a toolbar menu mode screen displayed on a touchscreen of a mobile terminal, whereby a user can execute functions provided by the terminal in intuitive manner.

Also, the user interface method and apparatus of the present invention allows the user to arrange graphical objects such as toolbar and function icons placed on the toolbar and active function objects presenting information provided by the functions represented by the function icons on the touchscreen, thereby improving decorative effect as well as interactivity of the touchscreen as user interface.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile terminal comprising:
   a sensor configured to detect a rotation of the mobile terminal;
   a touch screen configured to display a screen and detect a touch input; and
   at least one processor configured to control the touch screen to:
      display a screen comprising a second region for presenting a toolbar comprising at least one user interface (UI) element corresponding to a function of at least one function installed in the mobile terminal, and a first region for displaying activation of the function represented by the UI element,
      maintain, in response to a change of an orientation of the mobile terminal between a portrait orientation and a landscape orientation according to the rotation of the mobile terminal, the second region for the toolbar at a position that is relatively the same as a position of the second region for the toolbar before the change of the orientation of the mobile terminal, and
      change, in response to the change of the orientation of the mobile terminal, the orientation of the UI element within the second region according to the changed orientation of the mobile terminal.

2. The apparatus of claim 1, wherein the at least one processor is further configured to change the orientation of the first region in accordance with the changed orientation of the mobile terminal.

3. The apparatus of claim 1, wherein the at least one processor is further configured to activate the function represented by the UI element when the UI element is dragged from the toolbar and dropped in the first region using the touch input on the touch screen unit.

4. The apparatus of claim 1, wherein the at least one processor is further configured to maintain the second region for the toolbar at one of a center position, a left position, or a right position of the screen, that is substantially the same as a position of the second region for the toolbar before the change of the orientation of the mobile terminal.

5. The apparatus of claim 1, wherein the UI element comprises an icon symbolizing the function represented by the UI element.

6. The apparatus of claim 5, wherein the at least one processor is further configured to:
   retrieve and present a function list listing functions that can be registered with the toolbar,
   create a matching table that matches functions selected from the function list with corresponding icons, and
   activate, when the drag and drop activity of the icon is detected, the function matched with the icon in the matching table.

7. The apparatus of claim 1,
   wherein the screen comprises a marker such that, when a touch is detected on the marker and the toolbar is not shown, the toolbar is displayed, and
   wherein, when a touch is detected on the marker and the toolbar is shown, the toolbar is hidden.

8. The apparatus of claim 6, wherein the screen comprises a third region which presents information on the function when a touch is detected on the icon representing the function.

9. The apparatus of claim 6,
   wherein the toolbar comprises a photo album function icon representing a photo album function, and
   wherein the at least one processor is further configured to, when a drag and drop activity of the photo album function icon is detected on the touch screen unit, control the displaying of an active photo album function object comprising a presentation window for presenting an image stored in association with the photo album function and a first submenu button and a second submenu button for executing functions provided by the photo album function.

10. The apparatus of claim 1, wherein the at least one processor is further configured to remove the UI element dragged and dropped in the first region from the toolbar.

11. The mobile terminal of claim 1, wherein the at least one processor is further configured to, in response to the change of the orientation of the mobile terminal according to the rotation of the mobile terminal, control the touch screen to:
   maintain a position of the toolbar that is relatively the same as a position of the toolbar before the change of the orientation of the mobile terminal, and
   change the orientation of the UI element in a direction opposite to the rotation of the mobile terminal.

12. The mobile terminal of claim 1, wherein the at least one processor is further configured to, in response to the change of the orientation of the mobile terminal, control the touch screen to:
   maintain a position of the toolbar that is relatively the same as a position of the toolbar before the change of the orientation of the mobile terminal, and
   maintain a position of submenu buttons that is relatively the same as a position of the submenu buttons before the change of the orientation of the mobile terminal.

13. The mobile terminal of claim 1, wherein the at least one processor is further configured to, in response to the change of the orientation of the mobile terminal, control the touch screen to:
   maintain a position of the toolbar that is relatively the same as a position of the toolbar before the change of the orientation of the mobile terminal,
   maintain a position of submenu buttons that is relatively the same as a position of the submenu buttons before the change of the orientation of the mobile terminal, and
   change the orientation of the UI element in the toolbar and icons in the submenu buttons according to the changed orientation of the mobile terminal.

14. The mobile terminal of claim 1, wherein the at least one processor is further configured to, in response to the change of the orientation of the mobile terminal according to the rotation of the mobile terminal, control the touch screen to:
   maintain a position of the toolbar that is relatively the same as a position of the toolbar before the change of the orientation of the mobile terminal,
   maintain a position of submenu buttons that is relatively the same as a position of the submenu buttons before the change of the orientation of the mobile terminal, and
   change the orientation of the UI element in the toolbar and icons in the submenu buttons in a direction opposite to the rotation of the mobile terminal.

15. An interface method for a mobile terminal comprising a touch screen unit, the method comprising:
   displaying in a screen a second region for presenting a toolbar comprising at least one user interface (UI) element corresponding to at least one function installed in the mobile terminal;

displaying in the screen a first region for displaying activation of the function represented by the UI element;

detecting a rotation of the mobile terminal;

maintaining, in response to a change of an orientation of the mobile terminal between a portrait orientation and a landscape orientation according to the rotation of the mobile terminal, the second region for the toolbar at a position that is relatively the same as a position of the second region for the toolbar before the change of the orientation of the mobile terminal; and changing an orientation of the UI element within the second region according to the changed orientation of the mobile terminal.

16. The interface method of claim 15, further comprising changing an orientation of the first region in accordance with the changed orientation of the mobile terminal.

17. The interface method of claim 15, further comprising activating the function associated with the UI element when the UI element is dragged from the toolbar and dropped in the first region using the touch input on the touch screen unit.

18. The interface method of claim 15, wherein the maintaining comprises locating the second region for the toolbar at one of a center position, a left position and a right position of the screen, that is substantially the same as a position of the second region for the toolbar before the change of the orientation of the mobile terminal.

19. The interface method of claim 15, wherein the UI element comprises an icon symbolizing the function represented by the UI element.

20. The interface method of claim 19, further comprising:
displaying, when the mobile terminal enters a toolbar menu mode, a function list listing at least one function that can be registered with the toolbar; and
creating a matching table which matches functions selected from the function list with corresponding icons.

21. The interface method of claim 20, further comprising:
determining, when a touch is detected on a corresponding icon, information on the function represented by the icon from a setting information file; and
presenting the information of the function in a third region.

22. The interface method of claim 20, further comprising rendering, when at least two active function objects are overlapped in the first region, the active function objects to appear in a semi-transparent state.

23. The interface method of claim 20, further comprising arranging, when a touch is detected on one of the overlapped active function objects, the touched active function object moved in front of the other active function objects on the screen.

24. The interface method of claim 17, further comprising:
removing the UI element dragged and dropped in the first region from the toolbar.

25. The interface method of claim 15, further comprising:
in response to the change of the orientation of the mobile terminal according to the rotation of the mobile terminal, maintaining a position of the toolbar that is relatively the same as a position of the toolbar before the change of the orientation of the mobile terminal; and
changing the orientation of the UI element in a direction opposite to the rotation of the mobile terminal.

26. The interface method of claim 15, further comprising:
in response to the change of the orientation of the mobile terminal, maintaining a position of the toolbar that is relatively the same as a position of the toolbar before the change of the orientation of the mobile terminal;
maintaining a position of submenu buttons that is relatively the same as a position of submenu buttons before the change of the orientation of the mobile terminal; and
changing the orientation of the UI element according to the changed orientation of the mobile terminal.

27. The interface method of claim 15, further comprising:
in response to the change of the orientation of the mobile terminal, maintaining a position of the toolbar that is relatively the same as a position of the toolbar before the change of the orientation of the mobile terminal;
maintaining a position of submenu buttons that is relatively the same as a position of the submenu buttons before the change of the orientation of the mobile terminal; and
changing the orientation of the UI element in the toolbar and icons in the submenu buttons according to the changed orientation of the mobile terminal.

28. The interface method of claim 15, further comprising:
in response to the change of the orientation of the mobile terminal, maintaining a position of the toolbar that is relatively the same as a position of the toolbar before the change of the orientation of the mobile terminal;
maintaining a position of submenu buttons that is relatively the same as a position of the submenu buttons before the change of the orientation of the mobile terminal; and
changing the orientation of the UI element in the toolbar and icons in the submenu buttons in a direction opposite to the rotation of the mobile terminal.

* * * * *